US012769324B2

(12) United States Patent
Yoshida et al.

(10) Patent No.: US 12,769,324 B2
(45) Date of Patent: Oct. 20, 2026

(54) AUTOMATIC TRANSFER SYSTEM

(71) Applicant: Mitsubishi Electric Corporation, Tokyo (JP)

(72) Inventors: Hirotaka Yoshida, Tokyo (JP); Masanori Nimura, Tokyo (JP); Akira Yokoyama, Tokyo (JP); Masashi Okuma, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 188 days.

(21) Appl. No.: 18/700,725

(22) PCT Filed: Oct. 25, 2022

(86) PCT No.: PCT/JP2022/039693
§ 371 (c)(1),
(2) Date: Apr. 12, 2024

(87) PCT Pub. No.: WO2023/074672
PCT Pub. Date: May 4, 2023

(65) Prior Publication Data

US 2024/0402724 A1 Dec. 5, 2024

(30) Foreign Application Priority Data

Nov. 1, 2021 (JP) ................................ 2021-178824

(51) Int. Cl.
*G05D 1/246* (2024.01)
*G05D 105/28* (2024.01)

(52) U.S. Cl.
CPC ....... *G05D 1/2462* (2024.01); *G05D 2105/28* (2024.01)

(58) Field of Classification Search
CPC ......................... G05D 1/2462; G05D 2105/28
(Continued)

(56) References Cited

U.S. PATENT DOCUMENTS

2015/0334035 A1* 11/2015 Miwa .................... H04L 65/611 370/390
2017/0164318 A1* 6/2017 Smith ................... G01S 5/0289
(Continued)

FOREIGN PATENT DOCUMENTS

JP S49-112376 A 10/1974
JP S62-288907 A 12/1987
(Continued)

OTHER PUBLICATIONS

English Translation for JPH0561537A (Year: 2025).*
(Continued)

*Primary Examiner* — Mahmoud S Ismail
(74) *Attorney, Agent, or Firm* — XSENSUS LLP

(57) ABSTRACT

An automatic transfer system includes a guide path, a transfer vehicle, and a program for calculation of a travel route of the transfer vehicle. Each of a plurality of branch points and a plurality of stop positions included in the guide path is assigned with any one of position codes specified by a combination of three numbers, which is a number of pieces corresponding to a maximum order of channels included in the guide path. Each of three numbers specifying the position code is determined on the basis of a channel including a branch point or a stop position corresponding to the position code and on the basis of a sequential order of the branch point or the stop position from a start point of the channel.

20 Claims, 16 Drawing Sheets

(58) Field of Classification Search
USPC ........................................................ 701/25
See application file for complete search history.

(56) References Cited

U.S. PATENT DOCUMENTS

| | | | | |
|---|---|---|---|---|
| 2022/0404156 | A1 * | 12/2022 | Cheng ...................... | G06N 5/04 |
| 2025/0093875 | A1 * | 3/2025 | Radhakrishnan ...... | B60K 35/00 |

FOREIGN PATENT DOCUMENTS

| | | | | |
|---|---|---|---|---|
| JP | H05-061537 | A | | 3/1993 |
| JP | H0561537 | A | * | 3/1993 |
| JP | 2015-232874 | A | | 12/2015 |

OTHER PUBLICATIONS

Office Action issued Dec. 24, 2024 in Japanese Patent Application No. 2023-556455, 6 pages.
International Search Report and Written Opinion mailed on Jan. 10, 2023, received for PCT Application PCT/JP2022/039693, filed on Oct. 25, 2022, 9 pages including English Translation.

* cited by examiner

AUTOMATIC TRANSFER SYSTEM

CROSS-REFERENCE TO RELATED APPLICATIONS

This application is a National Stage Application, pursuant to 35 U.S.C. § 371, of International Patent Application No. PCT/JP2022/039693, filed Oct. 25, 2022 which claims priority from Japanese Patent Application No. 2021-178824, filed on Nov. 1, 2021, and the entire contents of each are incorporated herein by reference.

FIELD

The present disclosure relates to an automatic transfer system including a transfer vehicle that transfers a transfer object.

BACKGROUND

Causing a transfer vehicle to automatically travel on a guide path requires a travel route representing at which branch point the transfer vehicle is caused to change a course to travel and at which stop position the transfer vehicle is caused to stop. Conventionally, there are known a method of causing a system to store a travel route from each stop position to another stop position in advance, and a method using an algorithm such as Dijkstra's algorithm to calculate a travel route from each stop position to another stop position each time.

In the former method, when a layout of the guide path is changed or expanded, time and effort for additionally storing a new travel route is required accordingly. In the latter method, since a processing load is heavy, it is difficult to cause a control device having low processing capability to execute the latter method. As a means for solving these problems, there have been proposed: a method of assigning a number associated with a number assigned to a branch point, to a stop position present in a guide path after branching (see, for example, Patent Literature 1); and a method of calculating a travel route of a transfer vehicle on the basis of a number assigned to a branch point (see, for example, Patent Literature 2).

CITATION LIST

Patent Literature

Patent Literature 1: Japanese Patent Application Laid-open No. S62-288907

Patent Literature 2: Japanese Patent Application Laid-open No. S49-112376

SUMMARY OF INVENTION

Problem to be Solved by the Invention

The techniques disclosed in Patent Literature 1 and Patent Literature 2 make it possible to calculate a travel route with a processing load reduced to an extent to allow a control device having low processing capability to easily execute the calculation, while eliminating time and effort for additionally storing a new travel route in a case of changing or expanding a layout of the guide path.

However, in Patent Literature 1, backward movement of the transfer vehicle is not considered. Therefore, in the method disclosed in Patent Literature 1, a detour is required in order to move toward a stop position where the transfer vehicle has passed. In the method disclosed in Patent Literature 2, the number of digits of the number assigned to the branch point increases as the number of branches of the guide path increases, and information on stop positions must be separately stored, which requires a large memory capacity.

As described above, conventionally, there is a problem that it is difficult to construct an automatic transfer system enabling a transfer vehicle to move forward and backward without requiring time and effort for additionally storing a new travel route in a case of changing or expanding a layout of a guide path, by using a control device having a small memory capacity and low processing capability such as a programmable logic controller (PLC).

The present disclosure has been made in view of the above, and an object of the present disclosure is to provide an automatic transfer system that requires less time and effort for changing or expanding a layout of a guide path, enables a transfer vehicle to move forward and backward, and can be constructed by using a control device having low processing capability without requiring a large memory capacity.

Means to Solve the Problem

In order to solve the above-described problem and achieve the object, an automatic transfer system according to the present disclosure includes: a guide path including a plurality of branch points and a plurality of stop positions; a transfer vehicle that transfers a transfer object by moving on the guide path; and a program for calculation of a travel route of the transfer vehicle. The guide path includes one first-order channel, one or a plurality of second-order channels connected to the first-order channel, and one or a plurality of k-th order channels. k is a natural number of three or more. The first-order channel includes one or a plurality of branch points and a plurality of stop positions. The second-order channel is connected to a branch point included in the first-order channel. The k-th order channel includes one or a plurality of stop positions and is connected to a branch point included in a channel that is included in the guide path and is of an order corresponding to a number obtained by subtracting 1 from k. Each of the plurality of branch points and the plurality of stop positions included in the guide path is assigned with a position code specified by a combination of k pieces of numbers, which is a number of pieces corresponding to a maximum order of channels included in the guide path. Each of the k pieces of numbers specifying the position code is determined on the basis of a channel including a branch point or a stop position corresponding to the position code and on the basis of a sequential order of the branch point or the stop position from a start point of the channel. A combination of numbers specifying each position code is different from a combination of numbers specifying another position code. The program is a program for calculation of the travel route from one stop position to another stop position included in the guide path on the basis of a plurality of the position codes. The transfer vehicle moves on the guide path on the basis of the travel route calculated on the basis of the program.

Effects of the Invention

An automatic transfer system according to the present disclosure exhibits effects of reducing time and effort for changing or expanding a layout of a guide path, enabling a transfer vehicle to move forward and backward, and being able to be constructed by using a control device having low processing capability without requiring a large memory capacity.

DESCRIPTION OF EMBODIMENTS

Hereinafter, an automatic transfer system according to embodiments will be described in detail with reference to the drawings.

First Embodiment

Figure 1:
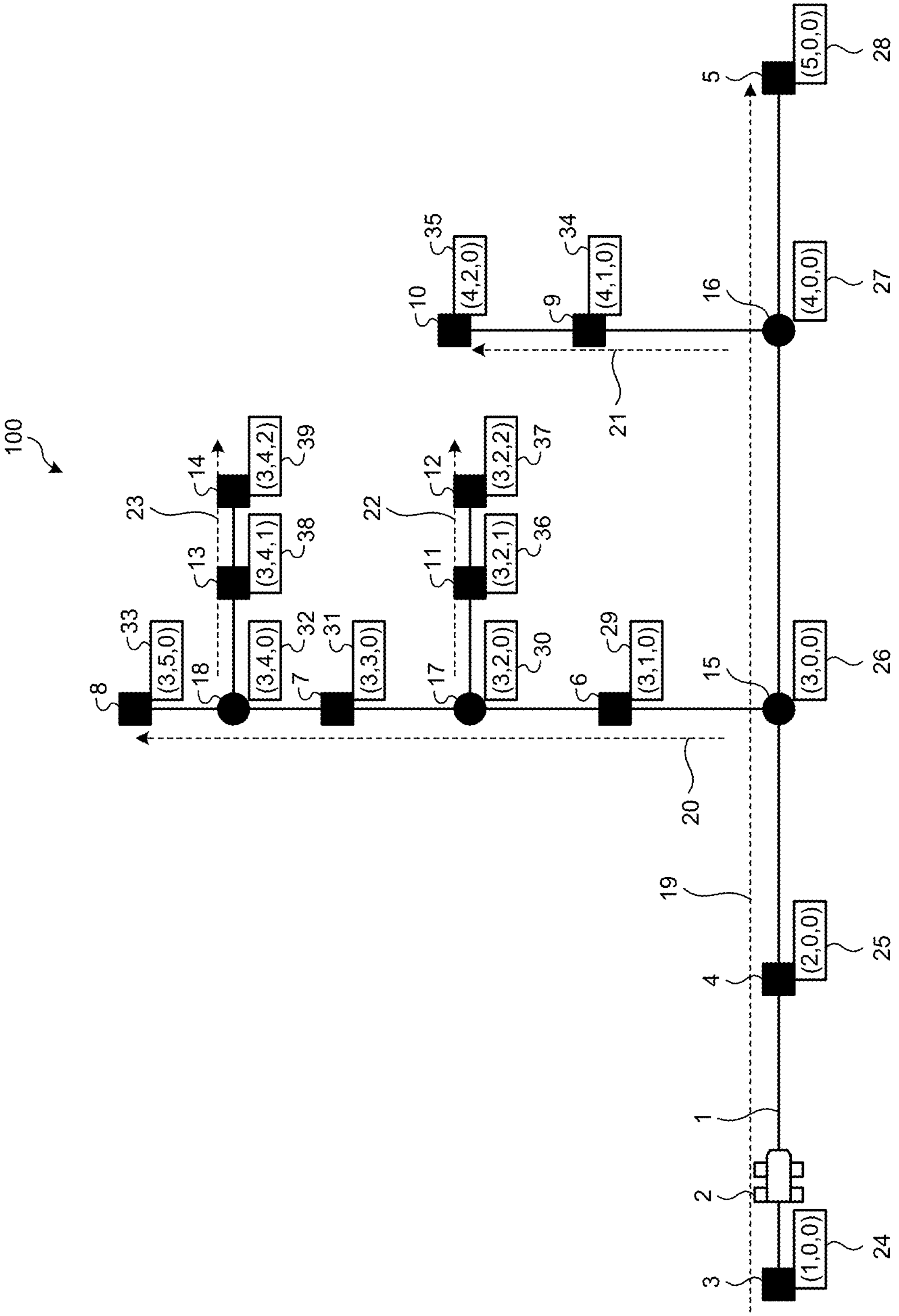
FIG. 1 is a diagram illustrating a layout of a guide path included in an automatic transfer system according to a first embodiment.

FIG. 1 is a diagram illustrating a layout of a guide path 1 included in an automatic transfer system 100 according to a first embodiment. As described above, the automatic transfer system 100 includes the guide path 1. The automatic transfer system 100 further includes a transfer vehicle 2 that moves on the guide path 1 and transfers a transfer object. FIG. 1 also illustrates the transfer vehicle 2. In FIG. 1, the guide path 1 and the transfer vehicle 2 are schematically illustrated. The guide path 1 includes a plurality of stop positions 3 to 14 and a plurality of branch points 15 to 18. While moving forward or backward on the guide path 1, the transfer vehicle 2 stops at any one of the plurality of stop positions 3 to 14 to transfer the transfer object.

Between a stop position or a branch point and another stop position or branch point adjacent to the stop position or the branch point, there is one route on which the transfer vehicle 2 can move forward or backward. The stop position is a position where a total number of adjacent stop positions or branch points is two or less. The branch position is a position where a total number of adjacent stop positions or branch points is three or more.

At the stop position and the branch point, the transfer vehicle 2 can change a direction by spin of the transfer vehicle 2 itself, rotation of the branch point in a state where the transfer vehicle 2 is placed thereon, or the like. The transfer vehicle 2 travels from a stop position or a branch point, and can travel to any other stop position or branch point adjacent to the stop position or the branch point.

The guide path 1 includes one first-order channel 19, a second-order channel 20 connected to the first-order channel 19, a second-order channel 21 connected to the first-order channel 19, a third-order channel 22 connected to the second-order channel 20, and a third-order channel 23 connected to the second-order channel 20. That is, the guide path 1 includes five channels. Each of the first-order channel 19 and the second-order channel 20 includes two branch points and a plurality of stop positions. The second-order channel 21 includes a plurality of stop positions. Each of the third-order channel 22 and the third-order channel 23 includes a plurality of stop positions.

The second-order channel 20 is a channel branched from the branch point 15 included in the first-order channel 19, and the second-order channel 21 is a channel branched from the branch point 16 included in the first-order channel 19. That is, the second-order channel 20 is connected to the branch point 15 included in the first-order channel 19, and the second-order channel 21 is connected to the branch point 16 included in the first-order channel 19. The third-order channel 22 is a channel branched from the branch point 17 included in the second-order channel 20, and the third-order channel 23 is a channel branched from the branch point 18 included in the second-order channel 20. That is, the third-order channel 22 is connected to the branch point 17 included in the second-order channel 20, and the third-order channel 23 is connected to the branch point 18 included in the second-order channel 20. The channel is a route of one way connecting a start point and an end point, or a route of one way connecting a start point and an end point of a route branched from a branch point. Each channel has an order such as a first order, a second order, or a third order.

The first-order channel 19 is a route connecting the stop position 3 as a start point and the stop position 5 as an end point. The second-order channel 20 is a route connecting the branch point 15 and the stop position 8 which is an end point of a route branched from the first-order channel 19 in a direction from the branch point 15 to the stop position 6. The second-order channel 21 is a route connecting the branch point 16 and the stop position 10 which is an end point of a route branched from the first-order channel 19 in a direction from the branch point 16 to the stop position 9. The third-order channel 22 is a route connecting the branch point 17 and the stop position 12 which is an end point of a route branched from the second-order channel 20 in a direction from the branch point 17 to the stop position 11. The third-order channel 23 is a route connecting the branch point 18 and the stop position 14 which is an end point of a route branched from the second-order channel 20 in a direction from the branch point 18 to the stop position 13.

The order of the channel is determined by which channel the channel is branched from. For example, the order of the channel branched from the first-order channel is the second-order, and the order of the channel branched from the second-order channel is the third-order. The order of the channel having the highest order among a plurality of channels constituting the guide path 1 is defined as a maximum order of the channels. Since only up to the third-order channel exists in the guide path 1 illustrated in FIG. 1, the maximum order of the channel is three in the guide path 1 illustrated in FIG. 1.

Each of all branch points and stop positions included in the guide path 1 is assigned with a position code specified by a combination of three numbers, which is a number of pieces corresponding to the maximum order of the channels included in the guide path 1. A combination of three numbers is set as one position code, and 16 position codes are assigned to the plurality of stop positions 3 to 14 and the plurality of branch points 15 to 18. Any one of reference numerals 24 to 39 is assigned to each of the 16 position codes. Note that, in each of the 16 position codes 24 to 39, the first number from the left is defined as a first-order channel position number, the second number from the left is defined as a second-order channel position number, and the third number from the left is defined as a third-order channel position number.

A method of determining the position code will be described below. A position code 24 of (1, 0, 0) is assigned to the stop position 3 which is the start point of the first-order channel 19. A stop position and a branch point included in the first-order channel 19 are assigned with a position code obtained by increasing only the first-order channel position number of the position code of a previous stop position or branch point by 1 for each advance in a direction from the start point to the end point in the first-order channel 19.

The position code 29 obtained by setting, to 1, only the second-order channel position number of the position code 26 assigned to the branch point 15 is assigned to the stop position 6 immediately after branching of the second-order channel 20 branched from the branch point 15. A stop position and a branch point included in the second-order channel 20 are assigned with a position code obtained by increasing only the second-order channel position number of the position code of a previous stop position or branch point by 1 for each advance in a direction from the start point to the end point in the second-order channel 20. Similarly, the position code 34 obtained by setting, to 1, only the second-order channel position number of the position code 27 assigned to the branch point 16 is assigned to the stop position 9 immediately after branching of the second-order channel 21 branched from the branch point 16, and a stop position and a branch point included in the second-order channel 21 are assigned with a position code obtained by increasing only the second-order channel position number of the position code of a previous stop position or branch point by 1 for each advance in a direction from the start point to the end point in the second-order channel 21.

The position code 36 obtained by setting, to 1, only the third-order channel position number of the position code 30 assigned to the branch point 17 is assigned to the stop position 11 immediately after branching of the third-order channel 22 branched from the branch point 17. A stop position and a branch point included in the third-order channel 22 are assigned with a position code obtained by increasing only the third-order channel position number of the position code of a previous stop position or branch point by 1 for each advance in a direction from the start point to the end point in the third-order channel 22. Similarly, the position code 38 obtained by setting, to 1, only the third-order channel position number of the position code 32 assigned to the branch point 18 is assigned to the stop position 13 immediately after branching of the third-order channel 23 branched from the branch point 18, and a stop position and a branch point included in the third-order channel 23 are assigned with a position code obtained by increasing only the third-order channel position number of the position code of a previous stop position or branch point by 1 for each advance in a direction from the start point to the end point in the third-order channel 23.

As described above, each of the three numbers specifying the position code is determined on the basis of a channel including a branch point or a stop position corresponding to the position code and on the basis of a sequential order of the branch point or the stop position from the start point of the channel. A combination of numbers specifying each position code is different from a combination of numbers specifying another position code.

The position code assigned to each of all the stop positions 3 to 14 and the branch points 15 to 18 may be specified by, for example, attaching a barcode that can be read by the transfer vehicle 2 to each stop position and each branch point. However, in the first embodiment, the position code is stored in a memory inside a control device of the automatic transfer system 100. The control device is not illustrated.

When the transfer vehicle 2 is located at a stop position or a branch point, the stop position or the branch point is defined as a current location of the transfer vehicle 2, and a position code assigned to the current location is defined as a position code of the current location of the transfer vehicle 2. When the transfer vehicle 2 is located at a stop position or a branch point, the transfer vehicle 2 can travel to another stop position or branch point adjacent to the current location of the transfer vehicle 2, by using some method such as moving forward, moving backward, or changing a direction.

The position code of the current location of the transfer vehicle 2 may be grasped by the transfer vehicle 2 reading a barcode attached to the stop position and the branch point. However, in the first embodiment, the position code is grasped by the control device of the automatic transfer system 100. That is, the control device tracks and grasps the position code of the current location of the transfer vehicle 2.

Figure 2:
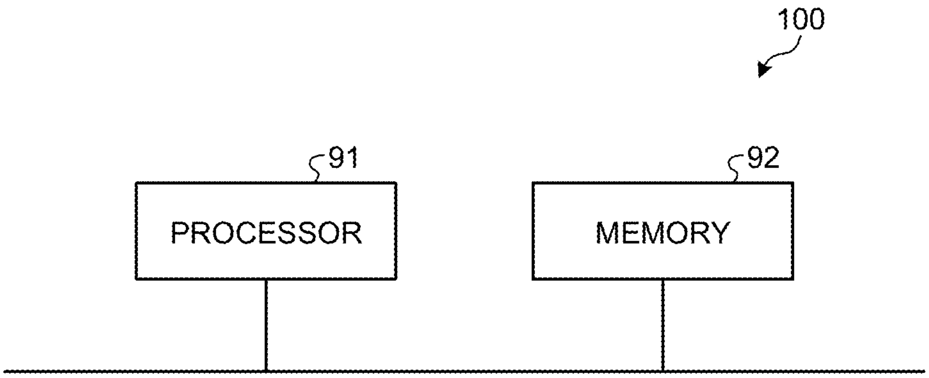
FIG. 2 is a diagram illustrating a processor and a memory included in the automatic transfer system according to the first embodiment.

FIG. 2 is a diagram illustrating a processor 91 and a memory 92 included in the automatic transfer system 100 according to the first embodiment. FIG. 2 schematically illustrates the processor 91 and the memory 92. The automatic transfer system 100 includes the memory 92 that stores a program for calculation of a travel route of the transfer vehicle 2. The automatic transfer system 100 also includes the processor 91 that calculates a travel route of the transfer vehicle 2 on the basis of the program stored in the memory 92. The program is for calculation of a travel route from one stop position to another stop position included in the guide path 1 on the basis of a plurality of position codes. The transfer vehicle 2 moves on the guide path 1 on the basis of the travel route calculated on the basis of the program.

The processor 91 is a central processing unit (CPU), a processing system, an arithmetic system, a microprocessor, or a digital signal processor (DSP). The memory 92 is, for example, a nonvolatile or volatile semiconductor memory such as a random access memory (RAM), a flash memory, an erasable programmable read only memory (EPROM), or an electrically erasable programmable read-only memory (EEPROM) (registered trademark); a magnetic disk; a flexible disk; an optical disk; a compact disk; a mini disk; a digital versatile disk (DVD); or the like.

Figure 3:
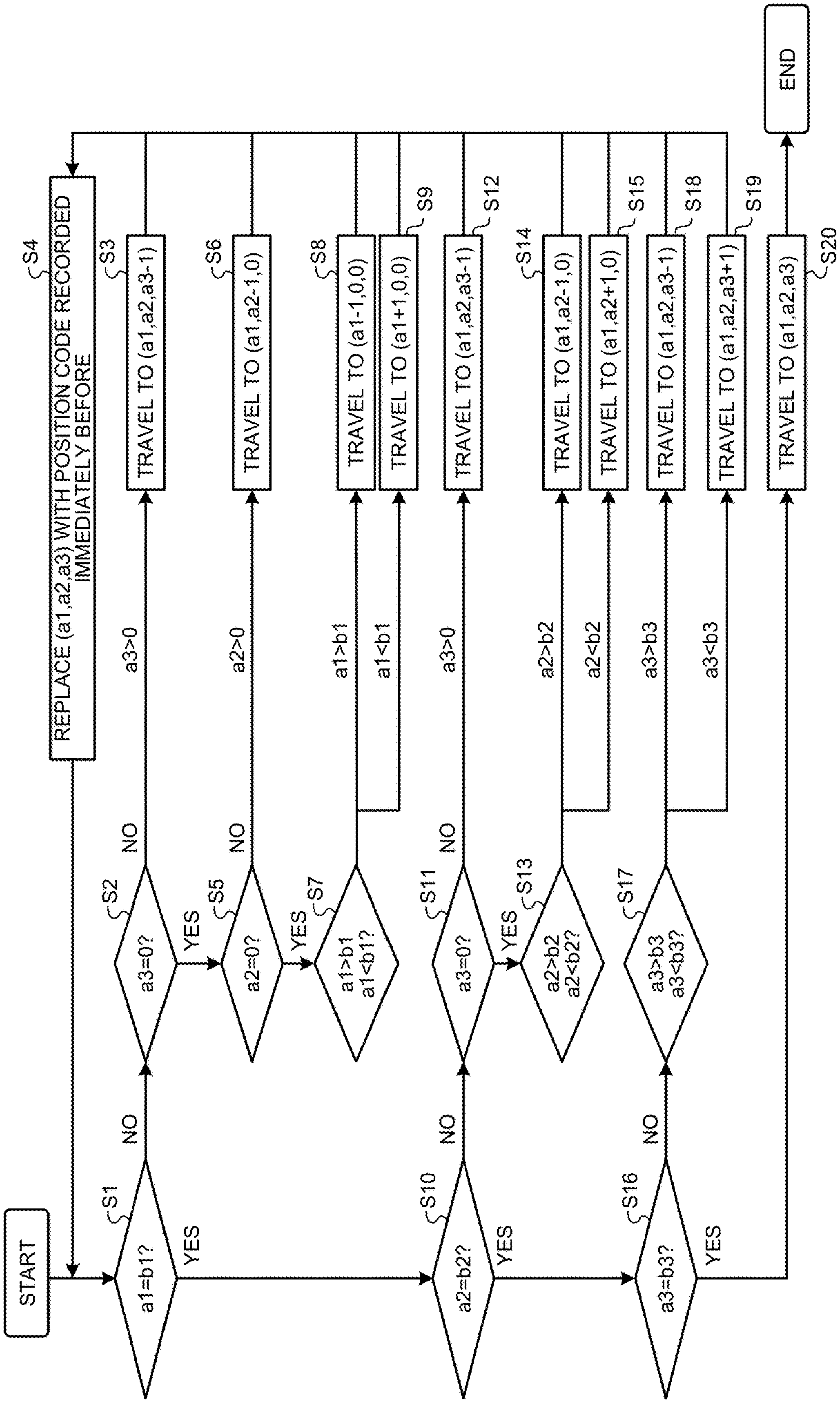
FIG. 3 is a flowchart illustrating a procedure of an operation of the automatic transfer system according to the first embodiment when a transfer vehicle travels.

Next, a moving method from the current location of the transfer vehicle 2 to a target destination will be described. Movement of the transfer vehicle 2 is performed by the processor 91 comparing the position code of the current location of the transfer vehicle 2 with a position code of the target destination. When the position code of the current location is (a1, a2, a3) and the position code of the target destination is (b1, b2, b3), the automatic transfer system 100 can cause the transfer vehicle 2 to travel from the current location to the target destination on the basis of a moving method illustrated in FIG. 3. FIG. 3 is a flowchart illustrating a procedure of an operation of the automatic transfer system 100 according to the first embodiment when the transfer vehicle 2 travels.

First, the processor 91 compares a first-order channel position number a1 of the current location of the transfer vehicle 2 with a first-order channel position number b1 of the target destination (S1). Specifically, in step S1, the processor 91 determines whether or not the first-order channel position number a1 of the current location of the transfer vehicle 2 matches the first-order channel position number b1 of the target destination.

When the processor 91 determines that the first-order channel position number a1 of the current location of the transfer vehicle 2 is different from the first-order channel position number b1 of the target destination (No in S1), the transfer vehicle 2 must travel on the first-order channel 19 to match the first-order channel position number a1 of the current location of the transfer vehicle 2 with the first-order channel position number b1 of the target destination. For this purpose, the transfer vehicle 2 needs to be in the first-order channel 19. Therefore, the processor 91 determines whether or not a third-order channel position number a3 of the current location of the transfer vehicle 2 is 0 (S2).

When the processor 91 determines that the third-order channel position number a3 of the current location of the transfer vehicle 2 is larger than 0 (No in S2), that is, when the transfer vehicle 2 is in the third-order channel, the transfer vehicle 2 travels to a stop position or a branch point assigned with a position code obtained by decreasing only the third-order channel position number a3 of the position code of the current location by 1 (S3). After the operation of step S3 is executed, the processor 91 replaces (a1, a2, a3) with the position code recorded immediately before in the memory 92 (S4), and executes the operation of step S1. Then, the automatic transfer system 100 repeats the operations from step S1 to step S4 until the third-order channel position number a3 of the current location becomes 0. As a result, the transfer vehicle 2 can leave the third-order channel and enter the second-order channel.

When the processor 91 determines that the third-order channel position number a3 of the current location of the transfer vehicle 2 is 0 (Yes in S2), the processor 91 determines whether or not a second-order channel position number a2 of the current location of the transfer vehicle 2 is 0 (S5). When the processor 91 determines that the second-order channel position number a2 of the current location of the transfer vehicle 2 is larger than 0 (No in S5), that is, when the transfer vehicle 2 is in the second-order channel, more specifically, when the third-order channel position number a3 of the current location of the transfer vehicle 2 is 0 and the second-order channel position number a2 is larger than 0, the transfer vehicle 2 travels to a stop position or a branch point assigned with a position code obtained by decreasing only the second-order channel position number a2 of the position code of the current location by 1 (S6).

After the operation of step S6 is executed, the processor 91 replaces (a1, a2, a3) with the position code recorded immediately before in the memory 92 (S4), and executes the operation of step S1. Then, the automatic transfer system 100 repeats the operations of steps S1, S2, S5, S6, and S4 until the second-order channel position number a2 of the current location becomes 0. As a result, the transfer vehicle 2 can leave the second-order channel and enter the first-order channel 19.

When the processor 91 determines that the second-order channel position number a2 of the current location of the transfer vehicle 2 is 0 (Yes in S5), that is, when the second-order channel position number a2 and the third-order channel position number a3 of the current location of the transfer vehicle 2 are 0 and the transfer vehicle 2 is in the first-order channel 19, the processor 91 determines whether the first-order channel position number a1 of the current location of the transfer vehicle 2 is larger or smaller than the first-order channel position number b1 of the target destination (S7).

When the processor 91 determines that the first-order channel position number a1 of the current location of the transfer vehicle 2 is larger than the first-order channel position number b1 of the target destination (a1>b1 in S7), the transfer vehicle 2 travels to a stop position or a branch point assigned with a position code obtained by decreasing only the first-order channel position number a1 of the position code of the current location by 1 (S8). When the processor 91 determines that the first-order channel position number a1 of the current location of the transfer vehicle 2 is smaller than the first-order channel position number b1 of the target destination (a1<b1 in S7), the transfer vehicle 2 travels to a stop position or a branch point assigned with a position code obtained by increasing only the first-order channel position number a1 of the position code of the current location by 1 (S9).

After the operation of step S8 or step S9 is executed, the processor 91 replaces (a1, a2, a3) with the position code recorded immediately before in the memory 92 (S4), and executes the operation of step S1. Then, the automatic transfer system 100 repeats the operations of steps S1, S2, S5, and S7, the operation of step S8 or step S9, and the operation of step S4, until the first-order channel position number a1 of the current location matches the first-order channel position number b1 of the target destination.

When the processor 91 determines that the first-order channel position number a1 of the current location of the transfer vehicle 2 matches the first-order channel position number b1 of the target destination (Yes in S1), the processor 91 determines whether or not the second-order channel position number a2 of the current location of the transfer vehicle 2 matches a second-order channel position number b2 of the target destination (S10).

When the processor 91 determines that the second-order channel position number a2 of the current location of the transfer vehicle 2 is different from the second-order channel position number b2 of the target destination (No in S10), the transfer vehicle 2 must travel on the second-order channel to match the second-order channel position number a2 of the current location of the transfer vehicle 2 with the second-order channel position number b2 of the target destination. For this purpose, the transfer vehicle 2 needs to be in the second-order channel or a branch path immediately before entering the second-order channel. Therefore, the processor 91 determines whether or not the third-order channel position number a3 of the current location of the transfer vehicle 2 is 0 (S11).

When the processor 91 determines that the third-order channel position number a3 of the current location of the transfer vehicle 2 is larger than 0 (No in S11), that is, when the transfer vehicle 2 is in the third-order channel, the transfer vehicle 2 travels to a stop position or a branch point assigned with a position code obtained by decreasing only the third-order channel position number a3 of the position code of the current location by 1 (S12). After the operation of step S12 is executed, the processor 91 replaces (a1, a2, a3) with the position code recorded immediately before in the memory 92 (S4), and executes the operation of step S1. Then, the automatic transfer system 100 repeats the operations of steps S1, S10, S11, S12, and S4 until the third-order channel position number a3 of the current location becomes 0. As a result, the transfer vehicle 2 can leave the third-order channel and enter the second-order channel.

When the processor 91 determines that the third-order channel position number a3 of the current location of the transfer vehicle 2 is 0 (Yes in S11), that is, when the transfer vehicle 2 is in the second-order channel or a branch path immediately before entering the second-order channel, the processor 91 determines whether the second-order channel position number a2 of the current location of the transfer vehicle 2 is larger or smaller than the second-order channel position number b2 of the target destination (S13).

When the processor 91 determines that the second-order channel position number a2 of the current location of the transfer vehicle 2 is larger than the second-order channel position number b2 of the target destination (a2>b2 in S13), the transfer vehicle 2 travels to a stop position or a branch point assigned with a position code obtained by decreasing only the second-order channel position number a2 of the position code of the current location by 1 (S14). When the processor 91 determines that the second-order channel position number a2 of the current location of the transfer vehicle 2 is smaller than the second-order channel position number b2 of the target destination (a2<b2 in S13), the transfer vehicle 2 travels to a stop position or a branch point assigned with a position code obtained by increasing only the second-order channel position number a2 of the position code of the current location by 1 (S15).

After the operation of step S14 or step S15 is executed, the processor 91 replaces (a1, a2, a3) with the position code recorded immediately before in the memory 92 (S4), and executes the operation of step S1. Then, the automatic transfer system 100 repeats the operations of steps S1, S10, S11, and S13, the operation of step S14 or step S15, and the operation of step S4, until the second-order channel position number a2 of the current location matches the second-order channel position number b2 of the target destination.

When the processor 91 determines that the second-order channel position number a2 of the current location of the transfer vehicle 2 matches the second-order channel position number b2 of the target destination (Yes in S10), the processor 91 determines whether or not the third-order channel position number a3 of the current location of the transfer vehicle 2 matches a third-order channel position number b3 of the target destination (S16).

When the processor 91 determines that the third-order channel position number a3 of the current location of the transfer vehicle 2 is different from the third-order channel position number b3 of the target destination (No in S16), the transfer vehicle 2 must travel on the third-order channel to match the third-order channel position number a3 of the current location of the transfer vehicle 2 with the third-order channel position number b3 of the target destination. Therefore, the processor 91 determines whether the third-order channel position number a3 of the current location of the transfer vehicle 2 is larger or smaller than the third-order channel position number b3 of the target destination (S17).

When the processor 91 determines that the third-order channel position number a3 of the current location of the transfer vehicle 2 is larger than the third-order channel position number b3 of the target destination (a3>b3 in S17), the transfer vehicle 2 travels to a stop position or a branch point assigned with a position code obtained by decreasing only the third-order channel position number a3 of the position code of the current location by 1 (S18). When the processor 91 determines that the third-order channel position number a3 of the current location of the transfer vehicle 2 is smaller than the third-order channel position number b3 of the target destination (a3<b3 in S17), the transfer vehicle 2 travels to a stop position or a branch point assigned with a position code obtained by increasing only the third-order channel position number a3 of the position code of the current location by 1 (S19).

After the operation of step S18 or step S19 is executed, the processor 91 replaces (a1, a2, a3) with the position code recorded immediately before in the memory 92 (S4), and executes the operation of step S1. Then, the automatic transfer system 100 repeats the operations of steps S1, S10, S16, and S17, the operation of step S18 or step S19, and the operation of step S4, until the third-order channel position number a3 of the current location matches the third-order channel position number b3 of the target destination.

In response to the above-described operations, the position code (a1, a2, a3) of the current location of the transfer vehicle 2 matches the position code (b1, b2, b3) of the target destination (Yes in S16), and the transfer vehicle 2 travels to the target destination specified by the position code (b1, b2, b3) (S20). As described above, the automatic transfer system 100 can cause the transfer vehicle 2 to travel to the target destination.

Figure 4:
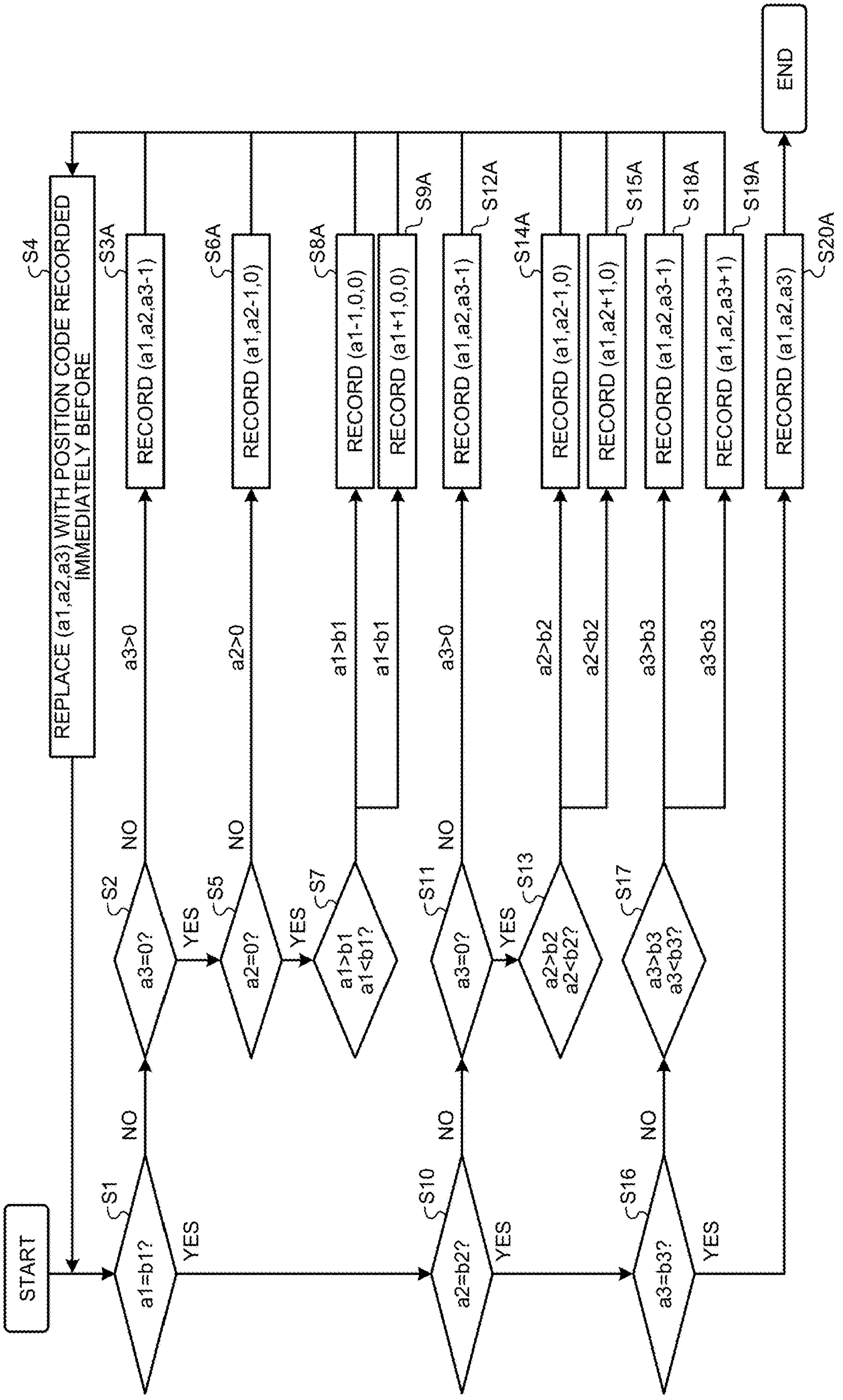
FIG. 4 is a flowchart illustrating a procedure of an operation of the processor according to the first embodiment when a travel route of the transfer vehicle is calculated.

Next, a method of calculating a travel route of the transfer vehicle 2 will be described. FIG. 4 is a flowchart illustrating a procedure of an operation of the processor 91 according to the first embodiment when a travel route of the transfer vehicle 2 is calculated. FIG. 4 is a flowchart in which the word "travel to" in steps S3, S6, S8, S9, S12, S14, S15, S18, S19, and S20 in FIG. 3 is replaced with the word "record".

In FIG. 4, step S3, step S6, step S8, step S9, step S12, step S14, step S15, step S18, step S19, and step S20 in FIG. 3 are replaced with step S3A, step S6A, step S8A, step S9A, step S12A, step S14A, step S15A, step S18A, step S19A, and step S20A. The processor 91 performs the operations of all steps illustrated in FIG. 4.

That is, in the flow of FIG. 3 when the transfer vehicle 2 is caused to travel from the current location to the target destination, as illustrated in FIG. 4, the processor 91 records and stores a destination of the transfer vehicle 2 in the memory 92 each time, and repeats comparison between a position code of the destination recorded immediately before and the position code of the target destination, instead of the transfer vehicle 2 actually traveling.

As a result, the processor 91 can calculate the position codes assigned to all the positions through which the transfer vehicle 2 passes, without the transfer vehicle 2 actually traveling. The processor 91 can calculate a travel route from the current location of the transfer vehicle 2 to the target destination by performing work of calculating the position codes assigned to all the positions through which the transfer vehicle 2 passes.

As long as four arithmetic operations, magnitude comparison of numbers, and recording of position codes can be performed, the travel route calculation method described above can be executed, so that the travel route calculation method described above can be executed using a control device having relatively low processing capability such as a PLC. In the automatic transfer system 100, since position codes including numbers associated with each other are assigned to a stop position before branching of the channel and a stop position after branching, the transfer vehicle 2 can move forward and backward. In the automatic transfer system 100, a position code specified by a combination of numbers whose number of pieces is equal to the order of the channel is assigned to all the stop positions and the branch points. Therefore, even if the number of branches increases, the required memory capacity does not increase as long as a maximum order of the channel does not change. That is, the automatic transfer system 100 according to the first embodiment requires less time and effort for changing or expanding a layout of the guide path 1, and enables the transfer vehicle 2 to move forward and backward, and it is possible to construct the automatic transfer system 100 by using a control device having low processing capability without requiring a large memory capacity.

Second Embodiment

In the first embodiment, a stop position or a branch point immediately after branching of a channel branched from a branch point is assigned with a position code obtained by setting, to 1, only a channel position number of an order identical to that of the channel in a position code assigned to the branch point as a branch source. In addition, in the first embodiment, a stop position and a branch point included in a channel after branching are assigned with a position code obtained by increasing only a channel position number of an order identical to that of the channel in a position code of a previous stop position or branch point by 1 for each advance in a direction from the start point to the end point in the channel.

In a second embodiment, the position code described in the first embodiment is assigned to a stop position or a branch point identical to a stop position or a branch point included in the guide path 1 according to the first embodiment illustrated in FIG. 1. In the second embodiment, there is a new channel in addition to the channels included in the guide path 1 according to the first embodiment illustrated in FIG. 1, and there is a new stop position in addition to the stop positions or the branch points included in the guide path 1. Furthermore, there may be a new branch point. In the second embodiment, differences from the first embodiment will be mainly described.

In the second embodiment, a stop position or a branch point immediately after branching of one channel branched from a branch point is assigned with a position code obtained by setting, to −1, only a channel position number of an order identical to that of the one channel in a position code assigned to the branch point as a branch source. In the second embodiment, a stop position and a branch point included in the one channel after branching are assigned with a position code obtained by decreasing only a channel position number of an order identical to that of the one channel in the position code of a previous stop position or branch point by 1 for each advance in a direction from a start point to an end point in the one channel.

Figure 5:
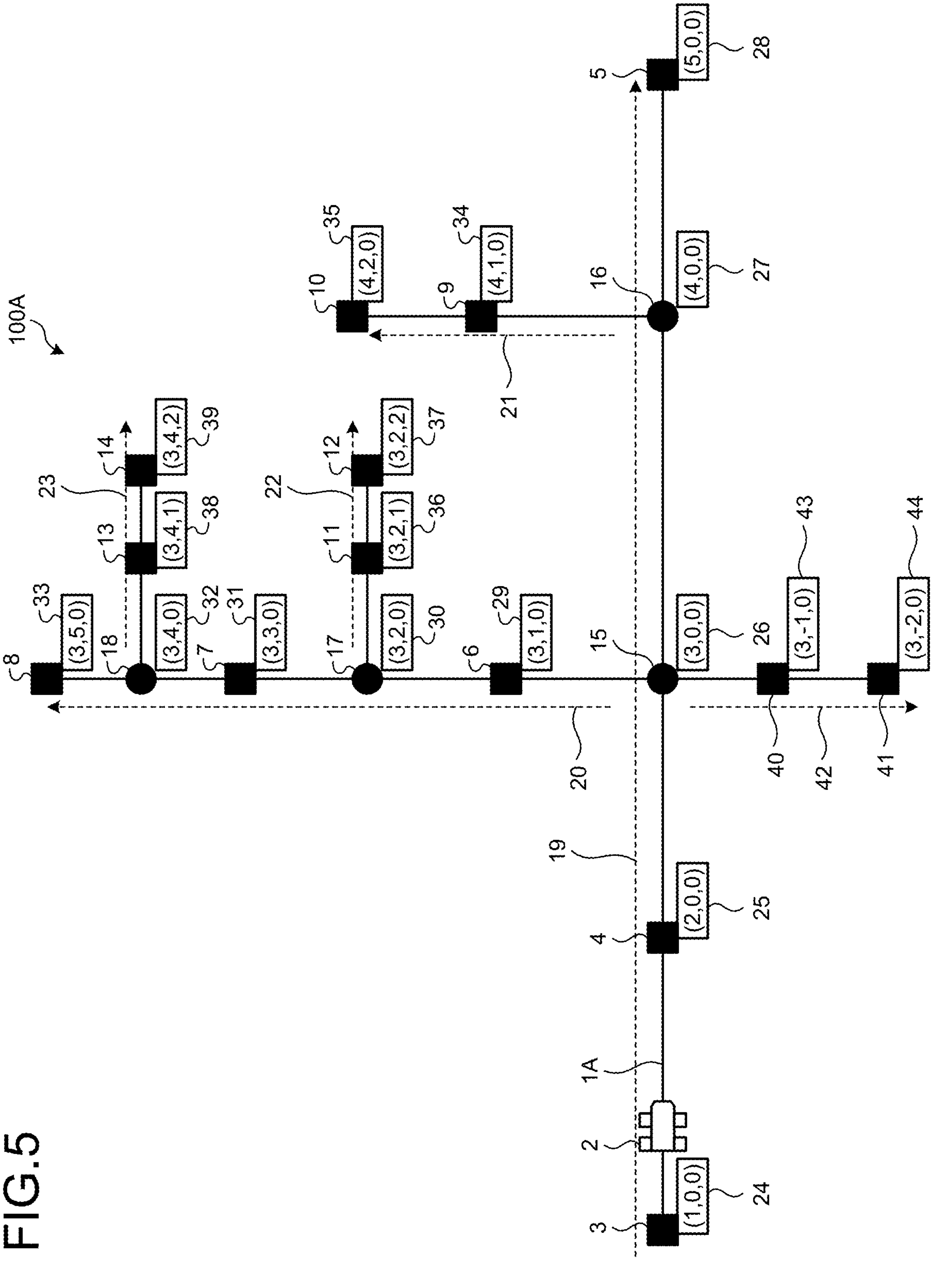
FIG. 5 is a diagram illustrating a layout of a guide path included in an automatic transfer system according to a second embodiment.

FIG. 5 is a diagram illustrating a layout of a guide path 1A included in an automatic transfer system 100A according to the second embodiment. The guide path 1A further includes a second-order channel 42 connected to the branch point 15, in addition to the channels, the stop positions, and the branch points included in the guide path 1 included in the automatic transfer system 100 according to the first embodiment. The second-order channel 42 includes a stop position 40 to which a position code 43 is assigned and a stop position 41 to which a position code 44 is assigned.

As illustrated in FIG. 5, a position code (3, −1, 0) obtained by setting, to −1, only the second-order channel position number of the position code assigned to the branch point 15 is assigned to the stop position 40 immediately after branching of the second-order channel 42 branched from the branch point 15. A position code (3, −2, 0) obtained by decreasing only the second-order channel position number of the position code of the stop position 40 before the stop position 41 by 1 is assigned to the stop position 41 included in the second-order channel 42.

As described above, each of a stop position and a branch point included in one second-order channel may be assigned with a position code obtained by decreasing only the second-order channel position number of the position code of a previous stop position or branch point by 1 for each advance in a direction from the start point to the end point in the second-order channel.

Figure 6:
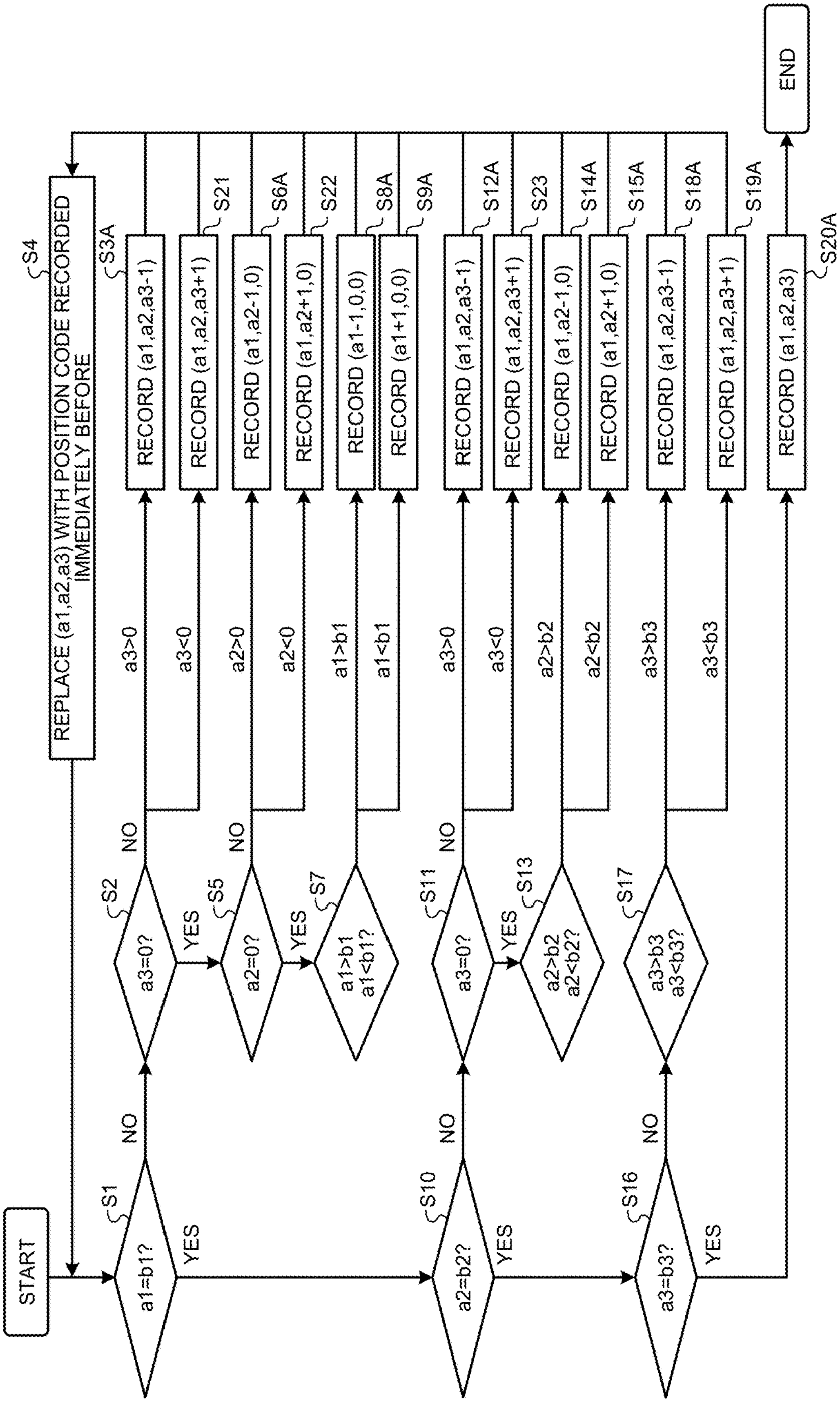
FIG. 6 is a flowchart illustrating a procedure of an operation of a processor according to the second embodiment when a travel route of a transfer vehicle is calculated.

FIG. 6 is a flowchart illustrating a procedure of an operation of the processor 91 according to the second embodiment when a travel route of the transfer vehicle 2 is calculated. The automatic transfer system 100A according to the second embodiment also includes the processor 91 and the memory 92. In the second embodiment, an operation is added in which, as a result of comparing the channel position number with 0 in the flow of calculating the travel route of the transfer vehicle 2 by the processor 91, when the channel position number is smaller than 0 ($a3<0$ in S2, $a2<0$ in S5, $a3<0$ in S11), a position code obtained by increasing only the channel position number by 1 is recorded in the memory 92 (S21, S22, and S23).

In addition to the operations described in the first embodiment, the processor 91 can calculate the travel route of the transfer vehicle 2 similarly to the first embodiment by performing the operations of steps S21, S22, and S23. That is, the processor 91 of the second embodiment can also calculate the travel route of the transfer vehicle 2 on the basis of a position code, for the guide path 1A having a channel branched from one branch point in two directions.

As described above, each number specifying the position code is a positive value, 0, or a negative value.

Third Embodiment

In the first and second embodiments, a stop position or a branch point immediately after branching of a channel branched from a branch point is assigned with a position code obtained by setting, to 1 or −1, only a channel position number of an order identical to that of the channel in a position code assigned to the branch point as a branch source. In addition, in the first and second embodiments, a stop position and a branch point included in a channel after branching are assigned with a position code obtained by increasing or decreasing only a channel position number of an order identical to that of the channel in a position code of a previous stop position or branch point by 1 for each advance in a direction from a start point to an end point.

In a third embodiment, in a position code assigned to a stop position or a branch point immediately after branching of a channel branched from a branch point, an absolute value of a channel position number of an order identical to that of the channel is larger than 0 but is not 1. Also in a case of increasing or decreasing only a channel position number of an order identical to that of the channel in a position code of a previous stop position or branch point for each advance in a direction from the start point to the end point in the channel, an increase or decrease amount is larger than 0 but is not 1. That is, in the third embodiment, in the position code, an absolute value of an increase or decrease amount of a value that changes for each advance in the channel is a value other than 1 and larger than 0. In the third embodiment, differences from the first embodiment or the second embodiment will be mainly described.

Figure 7:
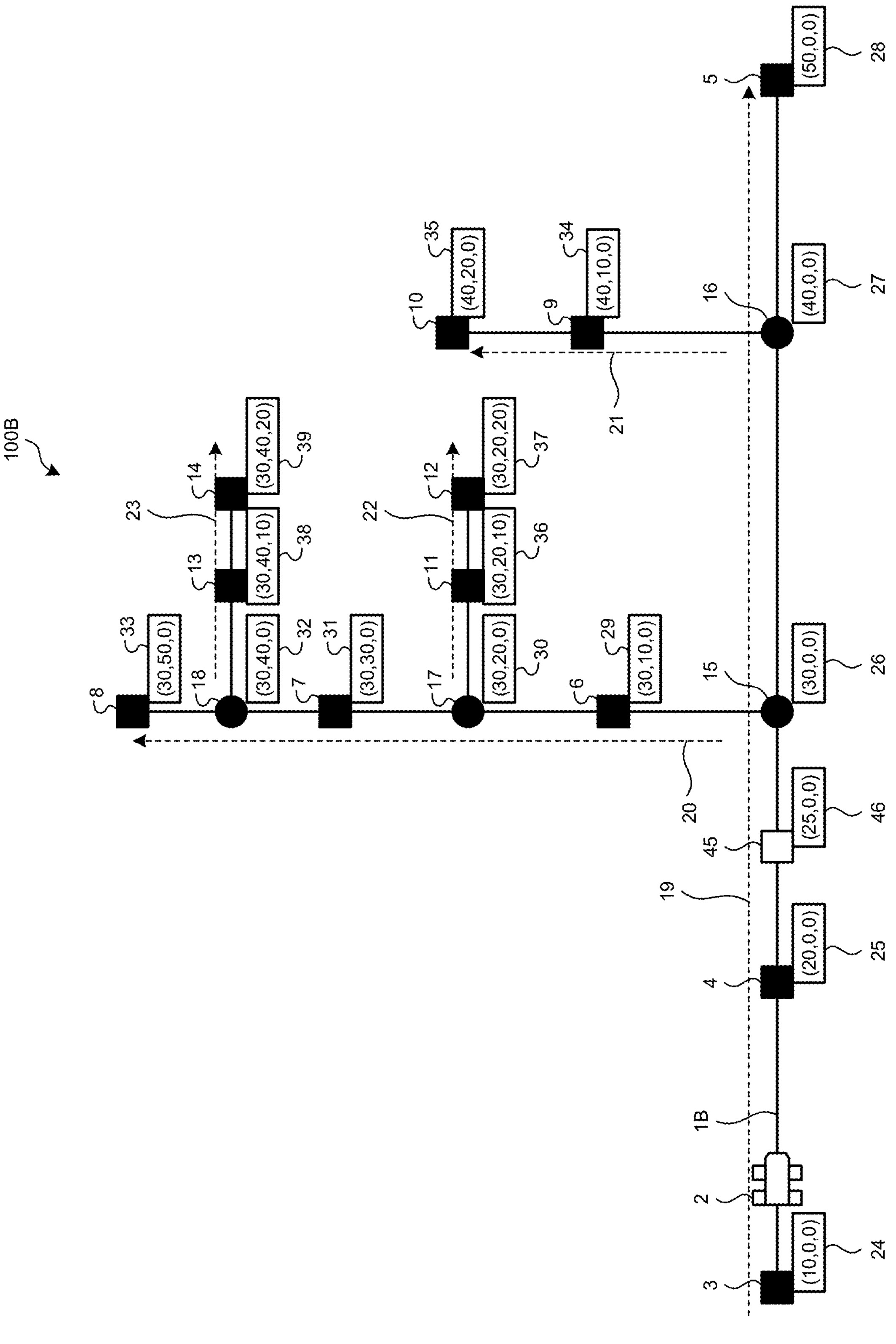
FIG. 7 is a diagram illustrating a layout of a guide path included in an automatic transfer system according to a third embodiment.

FIG. 7 is a diagram illustrating a layout of a guide path 1B included in an automatic transfer system 100B according to the third embodiment. In the guide path 1B, in a position code assigned to a stop position or a branch point immediately after branching of a channel branched from a branch point, except for a stop position 45, a channel position number of an order identical to that of the channel is 10. At each of a stop position and a branch point included in the channel, also in a case of increasing or decreasing only a channel position number of an order identical to that of the channel in a position code of a previous stop position or branch point for each advance in a direction from a start point to an end point in the channel, an increase or decrease amount is 10.

Figure 8:
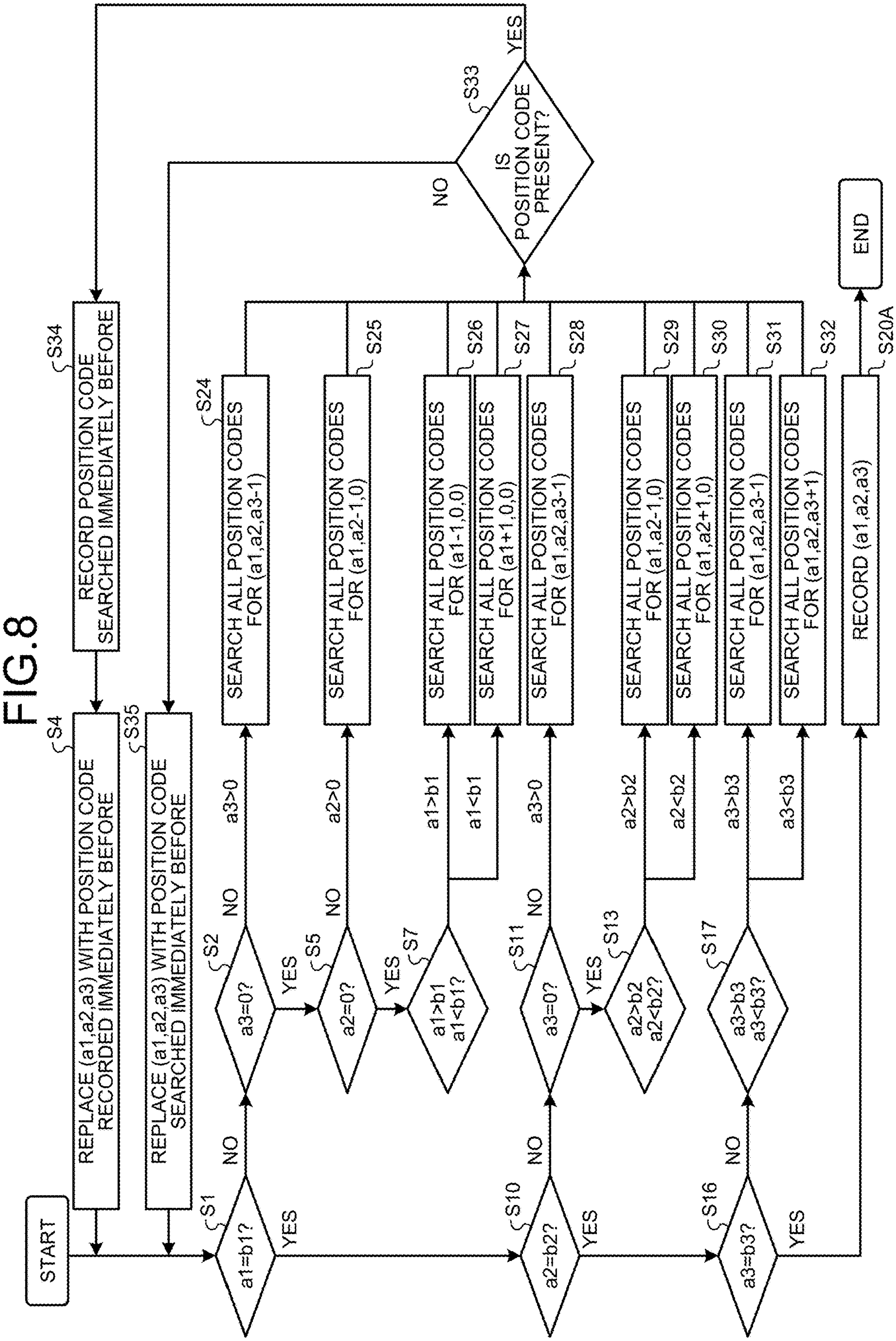
FIG. 8 is a flowchart illustrating a procedure of an operation of a processor according to the third embodiment when a travel route of a transfer vehicle is calculated.

FIG. 8 is a flowchart illustrating a procedure of an operation of the processor 91 according to the third embodiment when a travel route of the transfer vehicle 2 is calculated. The automatic transfer system 100B according to the third embodiment also includes the processor 91 and the memory 92.

As illustrated in FIG. 8, in the third embodiment, in a flow of calculating a travel route of the transfer vehicle 2 by the processor 91, an operation (S24, S25, S26, S27, S28, S29, S30, S31, and S32) of searching all position codes for a position code calculated immediately before is executed, before processing of storing a position code in the memory 92. In addition, after the operations of steps S24, S25, S26, S27, S28, S29, S30, S31, and S32 are performed, an operation (S33) of determining whether or not the position code calculated immediately before is present in all the position codes is performed.

When the processor 91 determines that the calculated position code is present (Yes in S33), the processor 91 records the position code searched immediately before into the memory 92 (S34). After performing the operation of step S34, the processor 91 performs the operation of step S4. When the processor 91 determines that the calculated position code is not present (No in S33), the processor 91 replaces the position code searched immediately before with the position code of the current location of the transfer vehicle 2 (S35). After performing the operation of step S35, the processor 91 performs the operation of step S1. Also in the third embodiment, the processor 91 can calculate a travel route of the transfer vehicle 2.

As illustrated in FIG. 7, when the new stop position 45 is added between the stop position 4 and the branch point 15, the stop position 45 is assigned with a position code (25, 0, 0) having a value between 20 of the first-order channel position number of the position code 25 and 30 of the first-order channel position number of the position code 26, for example, 25 as the first-order channel position number. A reference numeral 46 is assigned to the position code. When a stop position or a branch point is reduced from the guide path 1B, a position code assigned to a stop position or a branch point adjacent to the stop position or the branch point is not changed. Also in this case, the processor 91 can calculate a travel route of the transfer vehicle 2 by using the flow illustrated in FIG. 8. That is, according to the automatic transfer system 100B according to the third embodiment, it is possible to eliminate time and effort for reassigning a new position code when a layout of the guide path 1B is changed.

Fourth Embodiment

Figure 9:
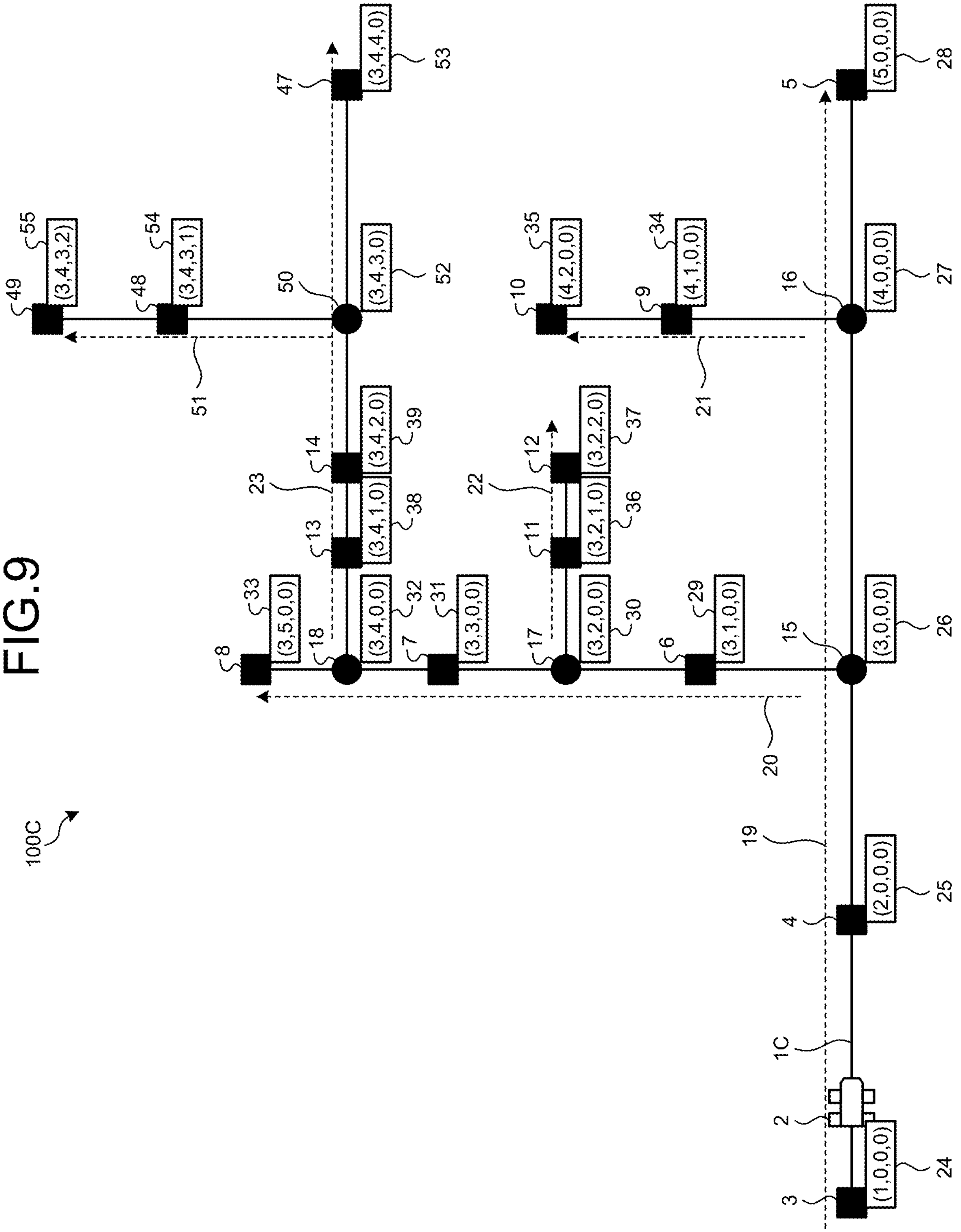
FIG. 9 is a diagram illustrating a layout of a guide path included in an automatic transfer system according to a fourth embodiment.

In the first to third embodiments, the guide paths 1, 1A, and 1B are exemplified in which a maximum order of the channel is three and a channel having the order of four or more is not provided. However, the guide path may include a channel having the order of four or more. FIG. 9 is a diagram illustrating a layout of a guide path 1C included in an automatic transfer system 100C according to a fourth embodiment. In the fourth embodiment, differences from the first to third embodiments will be mainly described.

As illustrated in FIG. 9, in the guide path 1C according to the fourth embodiment, a fourth-order channel 51 is branched from a branch point 50 included in the third-order channel 23. That is, the guide path 1C includes the fourth-order channel 51. The fourth-order channel 51 includes a stop position 48 and a stop position 49. In the fourth embodiment, the maximum order of the channel is four. Therefore, in the fourth embodiment, position codes assigned to all stop positions and branch points include four numbers. A position code 52 is assigned to the branch point 50. The third-order channel 23 includes a stop position 47 to which a position code 53 is assigned. A position code 54 is assigned to the stop position 48, and a position code 55 is assigned to the stop position 49.

Figure 10:
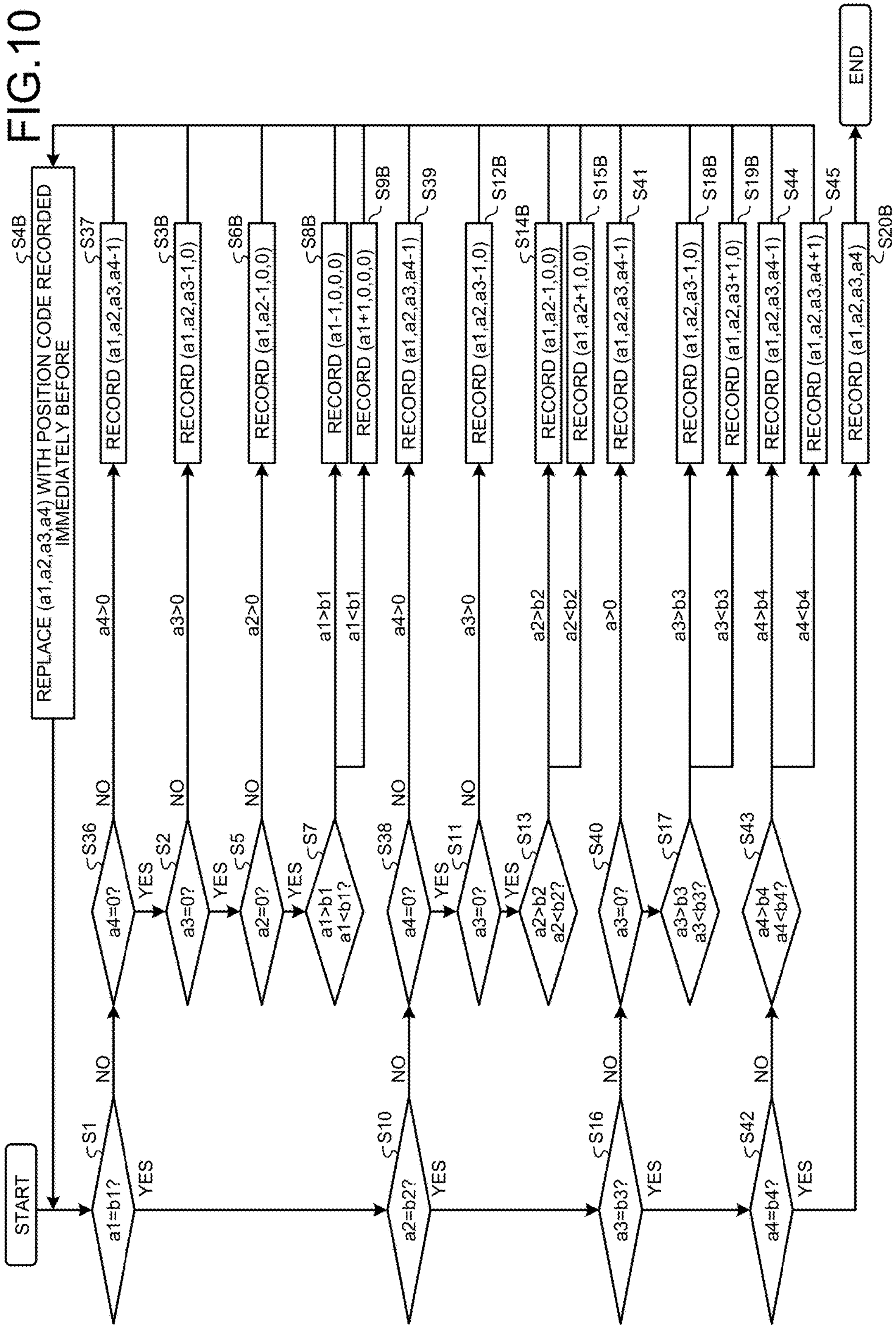
FIG. 10 is a flowchart illustrating a procedure of an operation of a processor according to the fourth embodiment when a travel route of a transfer vehicle is calculated.

FIG. 10 is a flowchart illustrating a procedure of an operation of the processor 91 according to the fourth embodiment when a travel route of the transfer vehicle 2 is calculated. The automatic transfer system 100C according to the fourth embodiment also includes the processor 91 and the memory 92.

The fourth embodiment additionally includes, as illustrated in FIG. 10, processing of leaving the fourth-order channel and entering the third-order channel, and processing of causing the transfer vehicle 2 to virtually travel in the fourth-order channel to match a fourth-order channel position number of a position code of a current location of the transfer vehicle 2 with a fourth-order channel position number of a position code of a target destination (S36, S37, S38, S39, S40, S41, S42, S43, S44, and S45). As a result, the processor 91 can calculate a travel route of the transfer vehicle 2 in the fourth embodiment similarly to the first to third embodiments.

Note that the operation of step S4 of the first embodiment is changed to an operation of step S4B "replace (a1, a2, a3, a4) with a position code recorded immediately before". The operation of step S20 of the first embodiment is changed to an operation of step S20B "record (a1, a2, a3, a4)". Similarly, step S3, step S6, step S8, step S9, step S12, step S14, step S15, step S18, and step S19 in the first embodiment are changed to step S3B, step S6B, step S8B, step S9B, step S12B, step S14B, step S15B, step S18B, and step S19B.

Even in a guide path having a channel of an order larger than the fourth order, the processor 91 can calculate a travel route of the transfer vehicle 2. That is, the processor 91 can calculate the travel route on the basis of a position code even for a guide path having a large number of branches.

Fifth Embodiment

Figure 11:
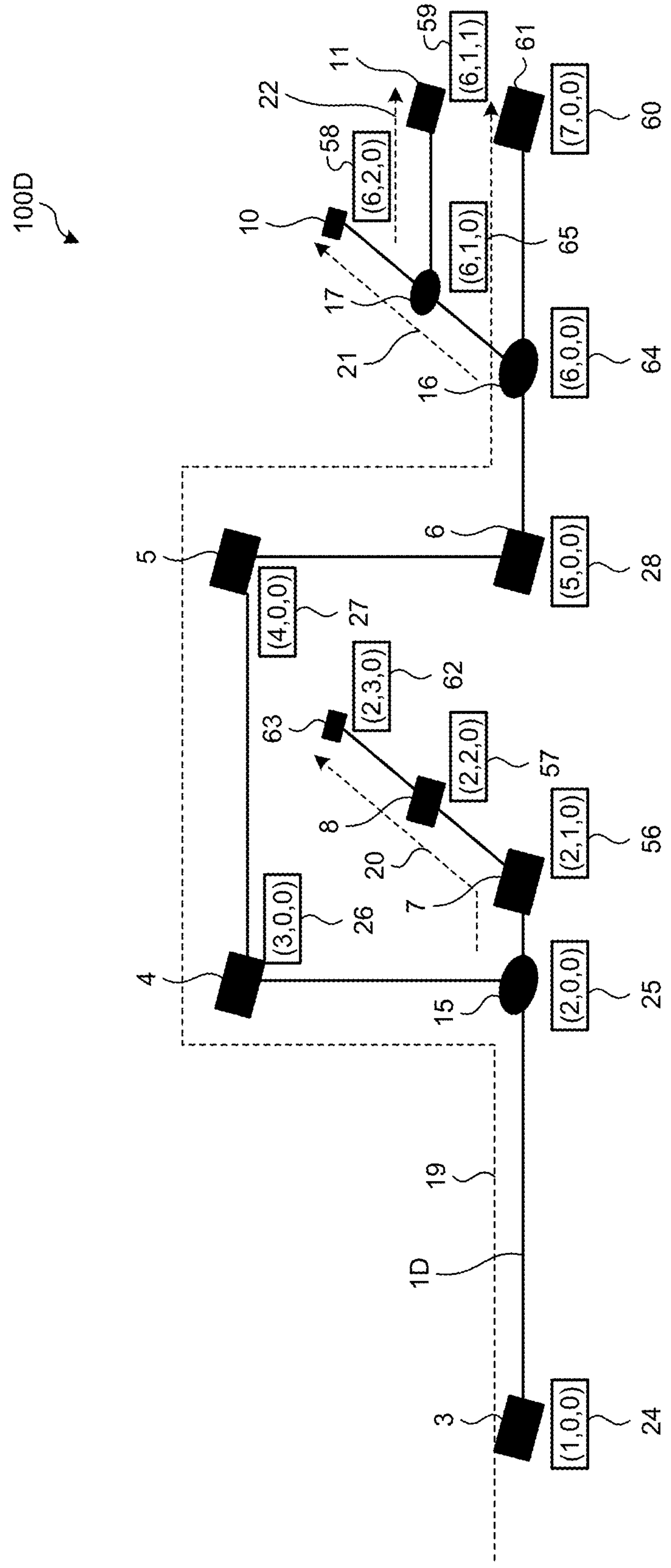
FIG. 11 is a diagram illustrating a layout of a guide path included in an automatic transfer system according to a fifth embodiment.

FIG. 11 is a diagram illustrating a layout of a guide path 1D included in an automatic transfer system 100D according to a fifth embodiment. The automatic transfer system 100D also includes the processor 91 and the memory 92. In the fifth embodiment, differences from the first to fourth embodiments will be mainly described.

The guide path may include a channel having a shape that is bent in any direction of upward, downward, leftward, or rightward. In the guide path 1D, a shape of the first-order channel 19 is a shape bent upward and downward, and a shape of the second-order channel 20 is a shape bent leftward. Also in this case, the processor 91 can calculate a travel route of the transfer vehicle 2 similarly to the first to fourth embodiments. As described above, the processor 91 included in the automatic transfer system 100D according to the fifth embodiment can calculate the travel route on the basis of a position code even for a guide path that is bent complicatedly.

Note that, in the fifth embodiment, the position code 26 of the first embodiment is assigned to the stop position 4, the position code 27 of the first embodiment is assigned to the stop position 5, the position code 28 of the first embodiment is assigned to the stop position 6, a position code 56 of (2, 1, 0) is assigned to the stop position 7, and a position code 57 of (2, 2, 0) is assigned to the stop position 8. A position code 58 of (6, 2, 0) is assigned to the stop position 10, and a position code 59 of (6, 1, 1) is assigned to the stop position 11. The first-order channel 19 includes a stop position 61 assigned with a position code 60 of (7, 0, 0), and the second-order channel 20 includes a stop position 63 assigned with a position code 62 of (2, 3, 0). The position code 25 of the first embodiment is assigned to the branch point 15, a position code 64 of (6, 0, 0) is assigned to the branch point 16, and a position code 65 of (6, 1, 0) is assigned to the branch point 17.

Sixth Embodiment

Figure 12:
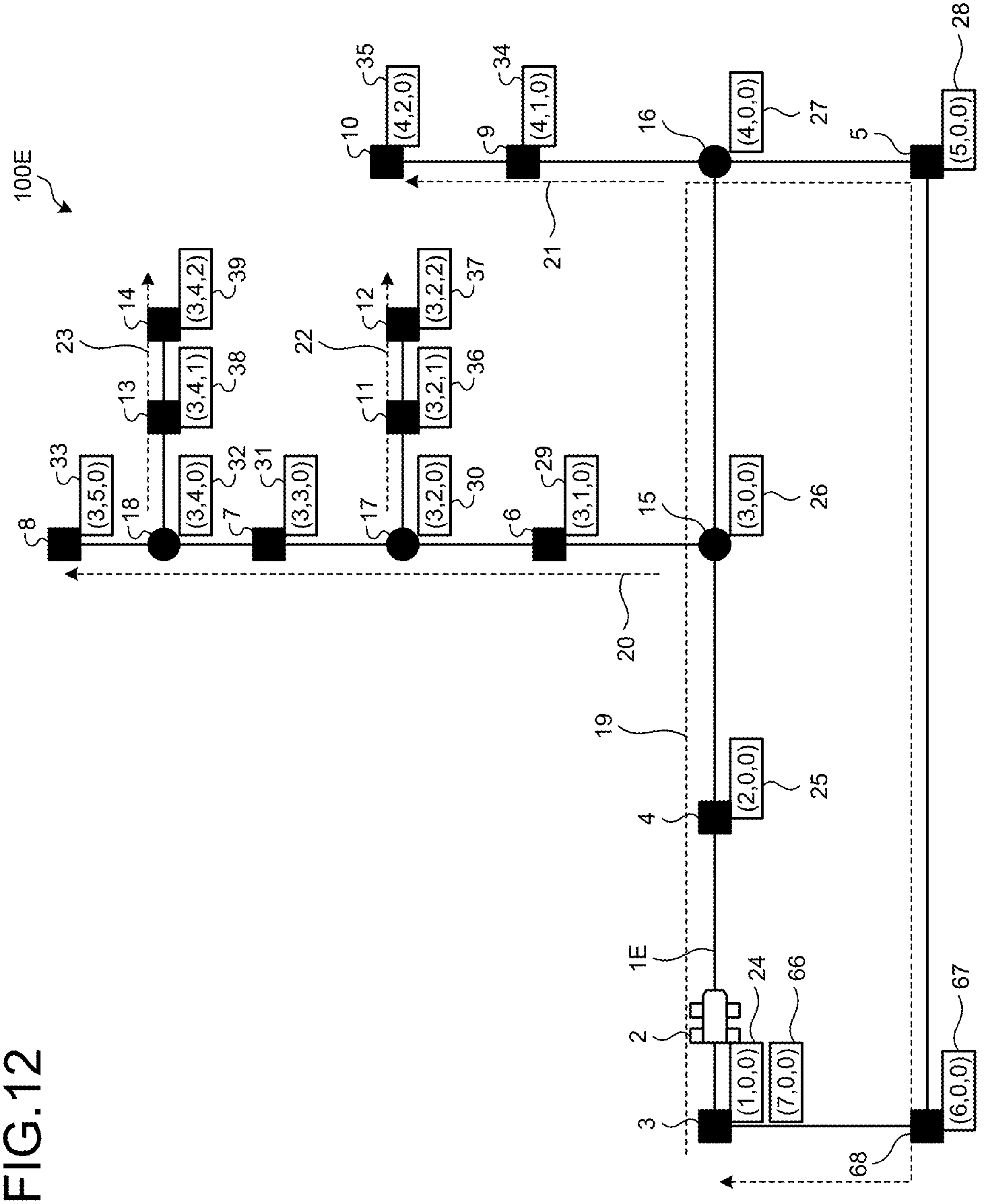
FIG. 12 is a diagram illustrating a layout of a guide path included in an automatic transfer system according to a sixth embodiment.

One channel included in a guide path may be a loop-shaped route. FIG. 12 is a diagram illustrating a layout of a guide path 1E included in an automatic transfer system 100E according to a sixth embodiment. The automatic transfer system 100E also includes the processor 91 and the memory 92. In the sixth embodiment, differences from the first to fifth embodiments will be mainly described.

In the guide path 1E, both a start point and an end point of the first-order channel 19 are the stop position 3, and the first-order channel 19 is a loop-shaped route in which a direction from the start point to the end point is clockwise. In the sixth embodiment, two position codes of the position code 24 and a position code 66 of (7, 0, 0) are assigned to the stop position 3. The first-order channel 19 further includes a stop position 68 to which a position code 67 is assigned.

Figure 13:
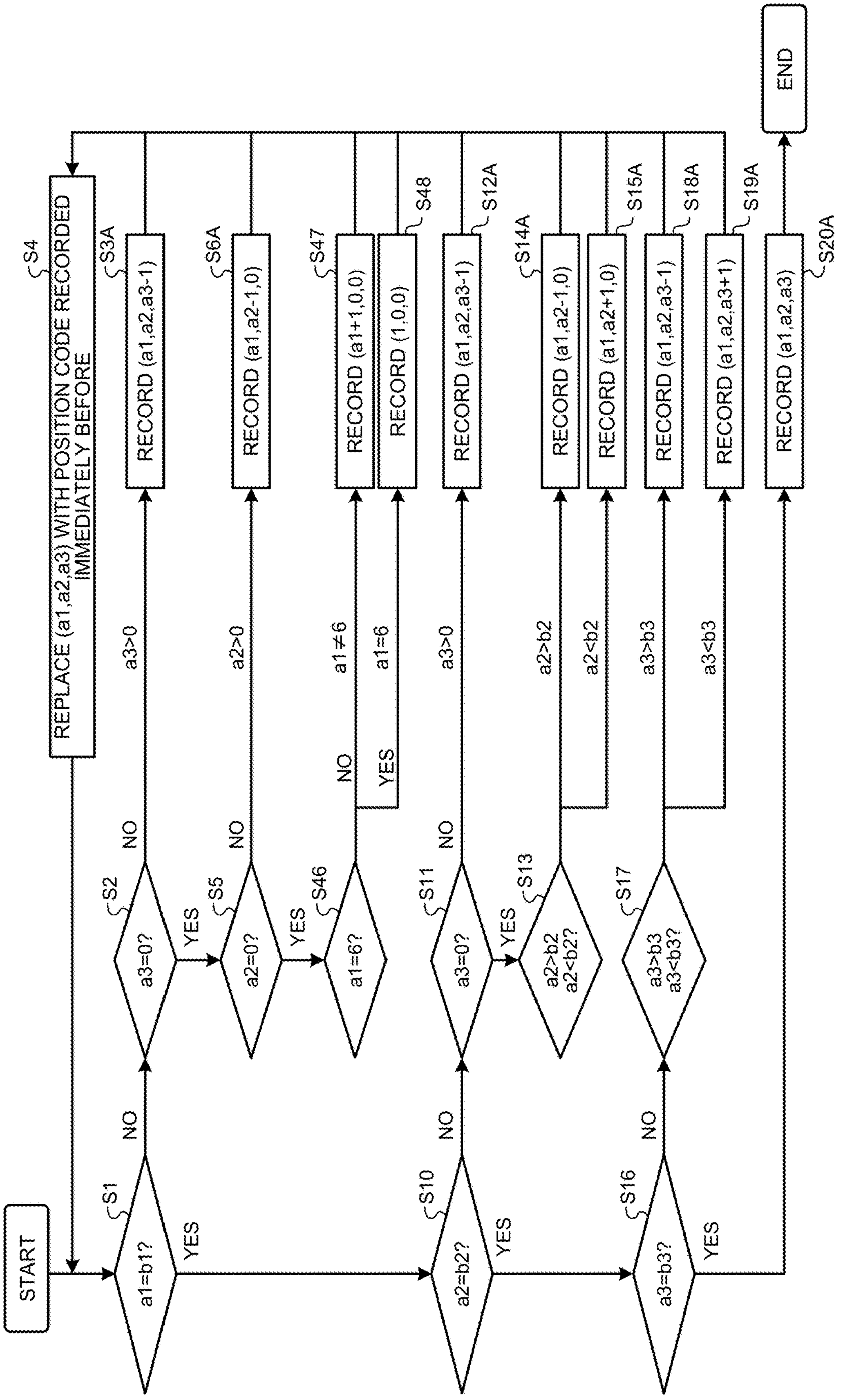
FIG. 13 is a flowchart illustrating a procedure of a first operation of a processor according to the sixth embodiment when a travel route of a transfer vehicle is calculated.
Figure 14:
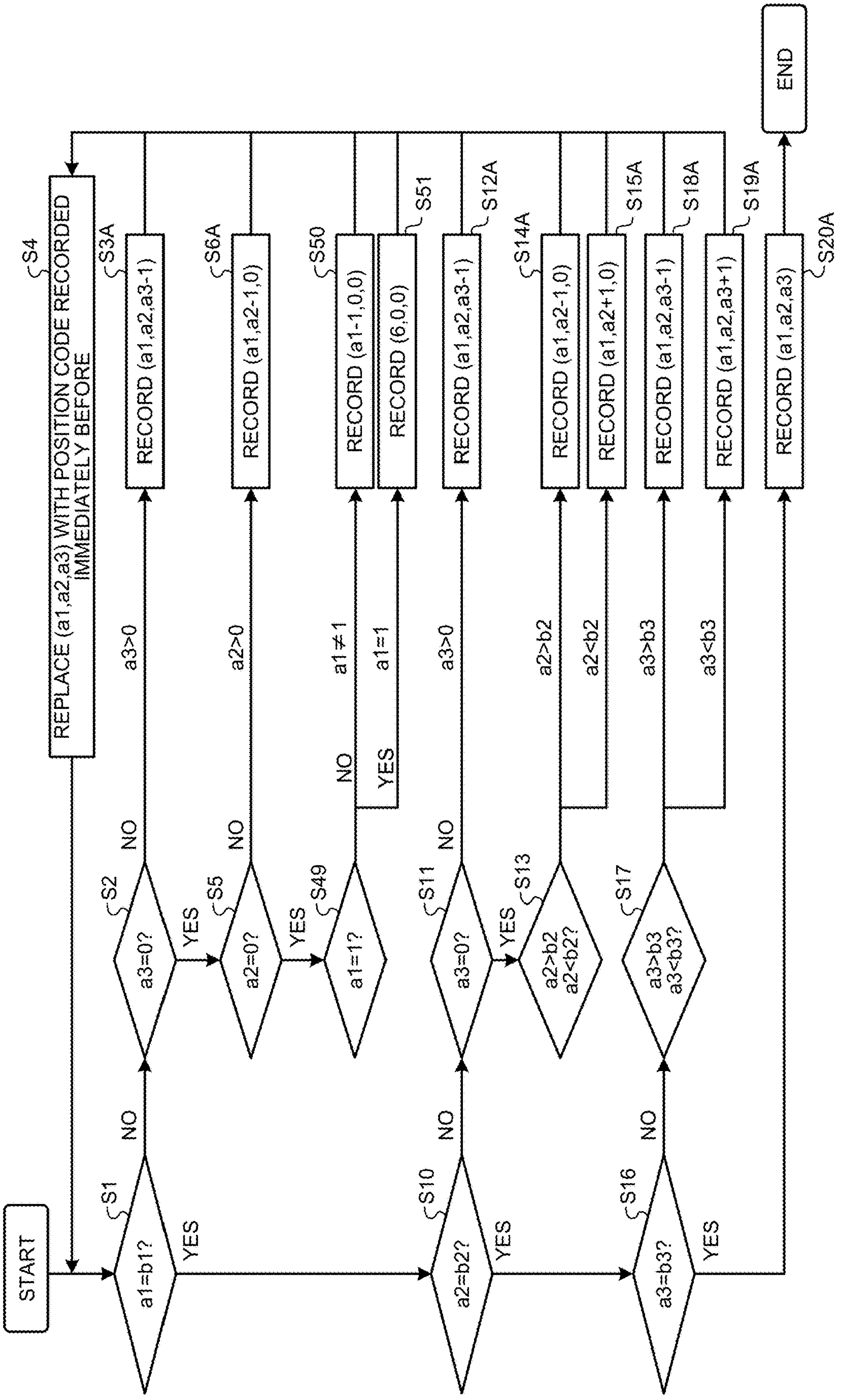
FIG. 14 is a flowchart illustrating a procedure of a second operation of the processor according to the sixth embodiment when a travel route of the transfer vehicle is calculated.

FIG. 13 is a flowchart illustrating a procedure of a first operation of the processor 91 according to the sixth embodiment when a travel route of the transfer vehicle 2 is calculated. FIG. 14 is a flowchart illustrating a procedure of a second operation of the processor 91 according to the sixth embodiment when a travel route of the transfer vehicle 2 is calculated. FIG. 13 is a flowchart when the transfer vehicle 2 moves clockwise in the first-order channel 19. FIG. 14 is a flowchart when the transfer vehicle 2 moves counterclockwise in the first-order channel 19.

In the flow illustrated in FIG. 13, when the processor 91 determines that the second-order channel position number a2 of the current location of the transfer vehicle 2 is 0 (Yes in S5), the processor 91 determines whether or not the first-order channel position number a1 of the current location of the transfer vehicle 2 is 6 (S46). When the processor 91 determines that the first-order channel position number a1 of the current location of the transfer vehicle 2 is not 6 (No in S46), the processor 91 records, in the memory 92, a position code obtained by increasing only the first-order channel position number a1 of the position code of the current location by 1 (S47). When the processor 91 determines that the first-order channel position number a1 of the current location of the transfer vehicle 2 is 6 (Yes in S46), the processor 91 records a position code of (1, 0, 0) into the memory 92 (S48).

In the flow illustrated in FIG. 14, when the processor 91 determines that the second-order channel position number a2 of the current location of the transfer vehicle 2 is 0 (Yes in S5), the processor 91 determines whether or not the first-order channel position number a1 of the current location of the transfer vehicle 2 is 1 (S49). When the processor 91 determines that the first-order channel position number a1 of the current location of the transfer vehicle 2 is not 1 (No in S49), the processor 91 records, in the memory 92, a position code obtained by decreasing only the first-order channel position number a1 of the position code of the current location by 1 (S50). When the processor 91 determines that the first-order channel position number a1 of the current location of the transfer vehicle 2 is 1 (Yes in S9), the processor 91 records a position code of (6, 0, 0) into the memory 92 (S51).

As illustrated in FIGS. 13 and 14, the processor 91 performs processing of causing the transfer vehicle 2 to move in the first-order channel 19 only clockwise or counterclockwise instead of processing of causing the transfer vehicle 2 to virtually travel in the first-order channel 19 to match the first-order channel position number of the position code of the current location of the transfer vehicle 2 with the first-order channel position number of the position code of the target destination, so that two types of travel routes can be calculated. A program of the sixth embodiment is also a program for calculation of a first travel route turning clockwise around the first-order channel 19, which is a loop-shaped route, and a second travel route turning counterclockwise around the first-order channel 19.

If one of the two types of travel routes is selected, it means that the travel route of the transfer vehicle 2 can be calculated. That is, the processor 91 included in the automatic transfer system 100E according to the sixth embodiment can calculate a travel route on the basis of a position code for the guide path 1E including a loop-shaped route.

Seventh Embodiment

In the first to sixth embodiments, a stop position and a branch point are assigned with a position code specified by a combination of numbers whose number of pieces corresponds to a maximum order of a channel. In a seventh embodiment, instead of the position code, a position number mutually convertible between with a position code is assigned to the stop position and the branch point. A program of the seventh embodiment is also a program for bidirectional conversion between a position code and a position number. In the seventh embodiment, differences from the first to sixth embodiments will be mainly described.

In the seventh embodiment, when a position code is (c1, c2, c3), a position number p obtained from the position code by the following Equation (1) is assigned to a stop position and a branch point to which the position code is assigned.

Formula 1

$$p = c1 + c1\max \times c2 + c1\max \times c2\max \times c3 \quad (1)$$

Reference character "c1" is a first-order channel position number, reference character "c2" is a second-order channel position number, and reference character "c3" is a third-order channel position number. Reference character "c1max" is a maximum value of the first-order channel position number, and reference character "c2max" is a maximum value of the second-order channel position number.

Figure 15:
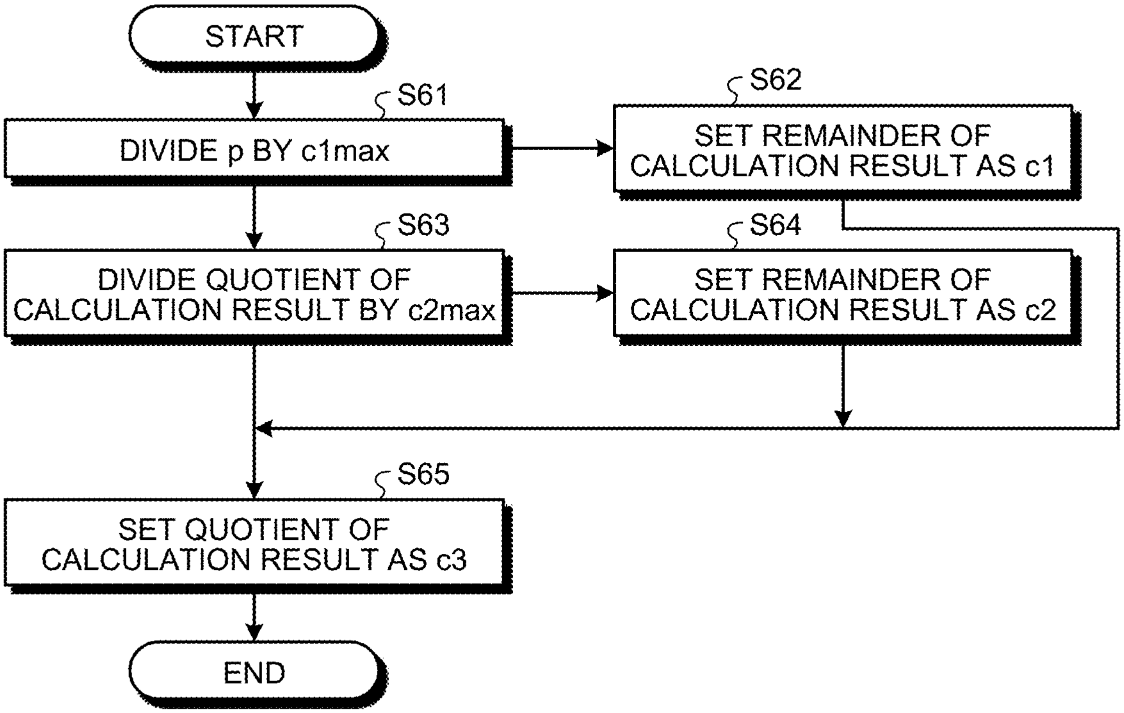
FIG. 15 is a flowchart illustrating a procedure of a first operation of a processor according to a seventh embodiment when the processor calculates a position code from a position number.

FIG. 15 is a flowchart illustrating a procedure of a first operation of the processor 91 according to the seventh embodiment when the processor 91 calculates the position code (c1, c2, c3) from the position number p. The automatic transfer system according to the seventh embodiment also includes the processor 91 and the memory 92. When the processor 91 calculates the position code (c1, c2, c3) from the position number p, the processor 91 divides p by c1max (S61), and sets a remainder of a calculation result obtained in the operation of step S61 as c1 (S62). The processor 91 divides a quotient of a calculation result obtained in the operation of step S61 by c2max (S63), and sets a remainder of a calculation result obtained in the operation of step S63 as c2 (S64). The processor 91 sets a quotient of a calculation result obtained in the operation of step S63 as c3 (S65).

The processor 91 can calculate all the channel position numbers by using the flow illustrated in FIG. 15, and can thereby convert the position numbers into position codes.

When a position number is assigned to a stop position and a branch point instead of a position code, before calculating a travel route of the transfer vehicle 2, the processor 91 can calculate the travel route of the transfer vehicle 2 by converting the position number into the position code by using the flow illustrated in FIG. 15 and converting a recorded travel route into the position number again on the basis of Equation (1).

In the seventh embodiment, since one number assigned to a stop position and a branch point is sufficient, it is possible to construct an automatic transfer system using a control device having a small memory capacity.

Note that, when the position code includes a negative value as described in the second embodiment, the position number p can be obtained from the position code including the negative value by using the following Equation (2) without using Equation (1).

Formula 2

$$p = (c1 - c1\min) + (c1\max - c1\min) \cdot (c2 - c2\min) + (c1\max - c1\min) \cdot c2\max - c2\min) \cdot (c3 - c3\min) + \ldots \quad (2)$$

Reference character "c1min" is a minimum value of the first-order channel position number, reference character "c2 min" is a minimum value of the second-order channel position number, and reference character "c3 min" is a minimum value of the third-order channel position number.

Figure 16:
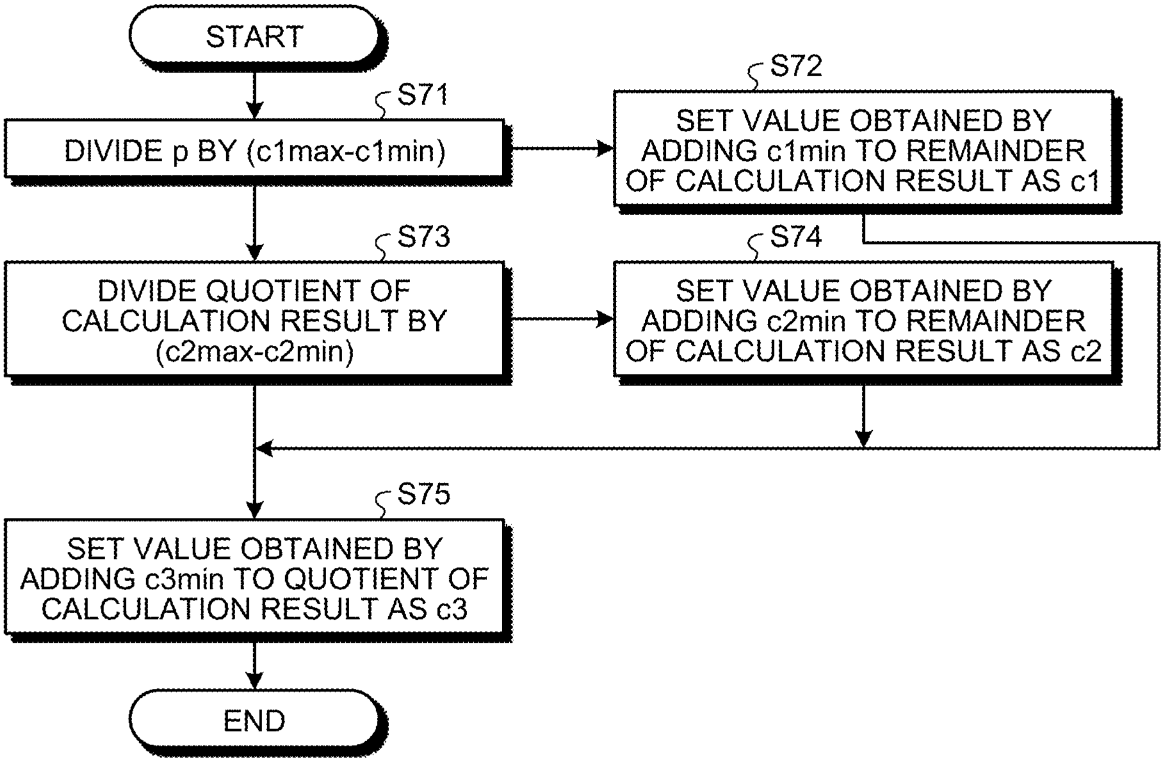
FIG. 16 is a flowchart illustrating a procedure of a second operation of the processor according to the seventh embodiment when the processor calculates a position code from the position number.

FIG. 16 is a flowchart illustrating a procedure of a second operation of the processor 91 according to the seventh embodiment when the processor 91 calculates the position code (c1, c2, c3) from the position number p. When the processor 91 calculates the position code (c1, c2, c3) from the position number p obtained by Equation (2), the processor 91 divides p by (c1max–c1min) (S71), and sets a value obtained by adding c1min to a remainder of a calculation result obtained in the operation of step S71 as c1 (S72). The processor 91 divides a quotient of the calculation result obtained in the operation of step S71 by (c2max–c2 min) (S73), and sets a value obtained by adding c2 min to a remainder of a calculation result obtained in the operation of step S73 as c2 (S74). The processor 91 sets a value obtained by adding c3 min to a quotient of the calculation result obtained in the operation of step S73 as c3 (S75).

The processor 91 can calculate all the channel position numbers by using the flow illustrated in FIG. 16, and can thereby convert the position numbers into position codes. Furthermore, the processor 91 can calculate a travel route of the transfer vehicle 2.

Eighth Embodiment

In the first embodiment, at a stop position and a branch point, the transfer vehicle 2 can travel to any other stop position or branch point adjacent to the stop position or the branch point described above by, for example, traveling after changing a direction by spin of the transfer vehicle 2 itself or rotation of the branch point in a state where the transfer vehicle 2 is placed thereon. In an eighth embodiment, sign information is assigned to a stop position and a branch point in addition to a position code. The sign information is information for specifying a traveling direction to an adjacent stop position or branch point. The position code may be replaced with the position number described in the seventh embodiment. An automatic transfer system according to the eighth embodiment instructs the transfer vehicle 2 to travel and change a direction on the basis of the sign information and the position code or the position number. In the eighth embodiment, differences from the first to seventh embodiments will be mainly described.

Figure 17:
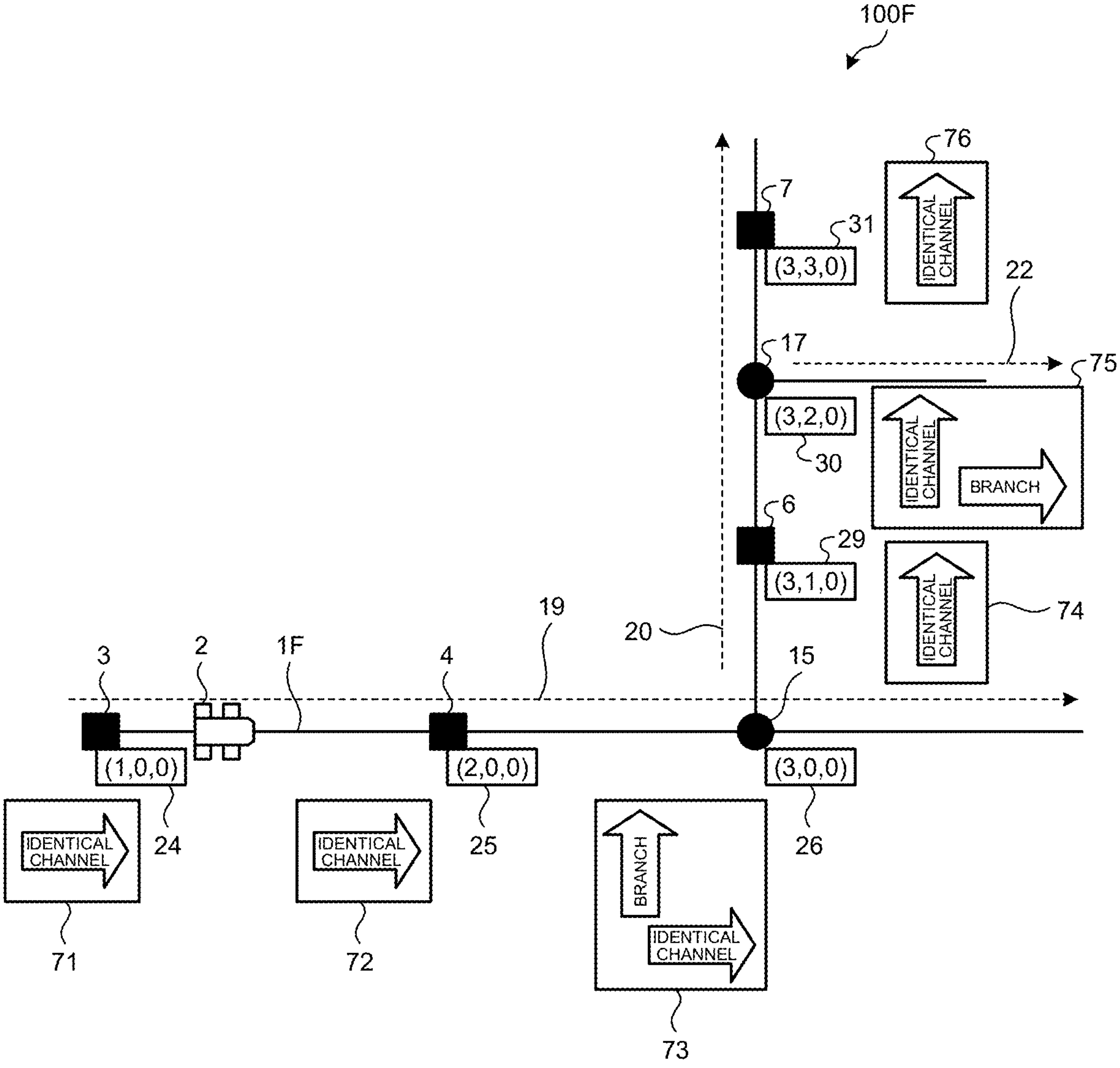
FIG. 17 is a diagram illustrating a layout of a guide path included in an automatic transfer system according to an eighth embodiment.

FIG. 17 is a diagram illustrating a layout of a guide path 1F included in an automatic transfer system 100F according to the eighth embodiment. In the guide path 1F, each of a plurality of stop positions and a plurality of branch points is assigned with any one of first sign information 71, 72, 74, and 76 including a first arrow indicating a direction at a time of advancing in a direction of an end point in a channel including the stop position or the branch point, and second sign information 73 and 75 different from the first sign information 71, 72, 74, and 76. The second sign information 73 and 75 is information including a first arrow and a second arrow indicating a direction when the channel is branched into another channel. The first arrow is assigned with the words "identical channel". The second arrow is assigned with the words "branch". When changing the traveling direction, the transfer vehicle 2 changes the traveling direction also by using the first arrow or the second arrow.

For example, the transfer vehicle 2 located at the branch point 15 changes the traveling direction such that a front surface of the transfer vehicle 2 faces a left direction in FIG. 17 when moving toward the stop position 4, and the transfer vehicle 2 changes the traveling direction such that the front surface of the transfer vehicle 2 faces an upper direction in FIG. 17 when moving toward the stop position 6. As a result, the front surface of the transfer vehicle 2 always faces the direction of the stop position of the channel on which the transfer vehicle 2 travels next.

After the transfer vehicle 2 changes the traveling direction, the processor 91 instructs the transfer vehicle 2 to move forward or backward, so that the transfer vehicle 2 can travel in the channel. When the processor 91 instructs the transfer vehicle 2 to move forward or backward, magnitude of a position code or a position number assigned to the current location of the transfer vehicle 2 is compared with magnitude of a position code or a position number assigned to a stop position or a branch point toward which the transfer vehicle 2 moves next.

For example, when the transfer vehicle 2 located at the branch point 15 moves toward the stop position 6, the second-order channel number of the position code assigned to the current location of the transfer vehicle 2 is 0 and the second-order channel number of the position code of the stop position toward which the transfer vehicle 2 moves next is 1, so that the latter value is larger than the former value. In this case, the processor 91 instructs the transfer vehicle 2 to move forward, so that the transfer vehicle 2 can travel in the direction of the stop position toward which the transfer vehicle 2 moves next. Conversely, when the latter value is smaller than the former value, the processor 91 instructs the transfer vehicle 2 to move backward, so that the transfer vehicle 2 can similarly travel in the direction of the stop position toward which the transfer vehicle 2 moves next.

When the automatic transfer system 100F is instructed to change the traveling direction of the transfer vehicle 2, the automatic transfer system 100F determines an instruction for the transfer vehicle 2 to move forward or backward by comparing magnitude of position codes or position numbers assigned to two adjacent locations. One of the two adjacent locations is a stop position or a branch point. Another of the two adjacent locations is also a stop position or a branch point.

The reason why the transfer vehicle 2 can be caused to move forward or backward is that a position code or a position number assigned to a stop position and a branch point has a feature that a larger value is always set as advancing in a direction of an end point of a channel, and the transfer vehicle 2 changes the traveling direction on the basis of the sign information, so that the front surface of the transfer vehicle 2 always faces the direction in which the transfer vehicle 2 travels next. Since the processor 91 can determine the instruction of forward movement or backward movement of the transfer vehicle 2 each time with a low processing load, it is possible to construct the automatic transfer system 100F using a control device having low processing capability.

The configurations described in the above embodiments are examples and can be combined with another known technique, the embodiments can be combined with each other, and a part of the configuration can be omitted or modified without departing from the gist.

REFERENCE SIGNS LIST

1, 1A, 1B, 1C, 1D, 1E, 1F guide path; 2 transfer vehicle; 3-14, 40, 41, 45, 47-49, 61, 63, 68 stop position; 15-18, 50 branch point; 19 first-order channel; 20, 21, 42 second-order channel; 22, 23 third-order channel; 24-39, 43, 44, 46, 52-60, 62, 64-67 position code; 51 fourth-order channel; 71, 72, 74, 76 first sign information; 73, 75 second sign information; 91 processor; 92 memory; 100, 100A, 100B, 100C, 100D, 100E, 100F automatic transfer system.

The invention claimed is:

1. An automatic transfer system comprising:

a guide path including a plurality of branch points and a plurality of stop positions;

a transfer vehicle to transfer a transfer object by moving on the guide path; and processing circuitry configured to calculate a travel route of the transfer vehicle, wherein the guide path includes one first-order channel, one or a plurality of second-order channels connected to the first-order channel, and one or a plurality of k-th order channels, k is a natural number of three or more, the first-order channel includes one or a plurality of branch points and a plurality of stop positions, each of the second-order channels is connected to a branch point included in the first-order channel, each of the k-th order channels includes one or a plurality of stop positions and is connected to a branch point included in a channel of an order corresponding to a number obtained by subtracting 1 from k, the channel being included in the guide path, each of the plurality of branch points and the plurality of stop positions included in the guide path is assigned with a position code specified by a combination of k numbers, the k being a number corresponding to a maximum order of channels included in the guide path, each of the k numbers specifying the position code is determined based on a channel including a branch point or a stop position corresponding to the position code and based on a sequential order of the branch point or the stop position from a start point of the channel, a combination of numbers specifying each of the position codes is different from a combination of numbers specifying another one of the position codes, when a new stop position is added between one of the plurality of stop positions and one of the plurality of branch points, a position code based on a position code of the one of the plurality of stop positions and a position code of the one of the plurality of branch points is assigned to the new stop position, the processing circuitry is configured to calculate the travel route from one stop position to another stop position included in the guide path based on a plurality of the position codes, and the transfer vehicle moves on the guide path based on the calculated travel route.

2. The automatic transfer system according to claim 1, wherein each of the k numbers specifying the position code is a positive value, 0, or a negative value.

3. The automatic transfer system according to claim 2, wherein in the position code, an absolute value of an increase or decrease amount of a value that changes for each advance in the channel is a value other than 1 and larger than 0.

4. The automatic transfer system according to claim 2, wherein the guide path includes a channel having a shape that is bent in any direction of upward, downward, leftward, or rightward.

5. The automatic transfer system according to claim 2, wherein one channel among a plurality of channels included in the guide path is a loop-shaped route, and two pieces of the position codes are assigned to at least one of the plurality of stop positions.

6. The automatic transfer system according to claim 5, wherein the processing circuitry is configured to calculate a first travel route that turns clockwise in the loop-shaped route and a second travel route that turns counterclockwise in the loop-shaped route.

7. The automatic transfer system according to claim 2, wherein instead of the position code, a position number mutually convertible with the position code is assigned to each of the plurality of branch points and the plurality of stop positions included in the guide path, and the processing circuitry is configured to perform bidirectional conversion between the position code and the position number.

8. The automatic transfer system according to claim 7, wherein in addition to the position number, sign information for specifying a traveling direction to an adjacent stop position or branch point is assigned to each of the plurality of branch points and the plurality of stop positions included in the guide path, when a direction of the transfer vehicle is instructed to be changed, an instruction for the transfer vehicle to move forward or backward is determined by comparing magnitude of the position numbers assigned to two adjacent locations based on the sign information, one of the two adjacent locations is a stop position or a branch point, and another of the two adjacent locations is a stop position or a branch point.

9. The automatic transfer system according to claim 2, wherein in addition to the position code, sign information for specifying a traveling direction to an adjacent stop position or branch point is assigned to each of the plurality of branch points and the plurality of stop positions included in the guide path, when a direction of the transfer vehicle is instructed to be changed, an instruction for the transfer vehicle to move forward or backward is determined by comparing magnitude of the position codes assigned to two adjacent locations based on the sign information, one of the two adjacent locations is a stop position or a branch point, and another of the two adjacent locations is a stop position or a branch point.

10. The automatic transfer system according to claim 1, wherein, in the position code, an absolute value of an increase or decrease amount of a value that changes for each advance in the channel is a value other than 1 and larger than 0.

11. The automatic transfer system according to claim 1, wherein the guide path includes a channel having a shape that is bent in any direction of upward, downward, leftward, or rightward.

12. The automatic transfer system according to claim 1, wherein one channel among a plurality of channels included in the guide path is a loop-shaped route, and two pieces of the position codes are assigned to at least one of the plurality of stop positions.

13. The automatic transfer system according to claim 12, wherein the processing circuitry is configured to calculate a first travel route that turns clockwise in the loop-shaped route and a second travel route that turns counterclockwise in the loop-shaped route.

14. The automatic transfer system according to claim 1, wherein instead of the position code, a position number mutually convertible with the position code is assigned to each of the plurality of branch points and the plurality of stop positions included in the guide path, and the processing circuitry is configured to perform bidirectional conversion between the position code and the position number.

15. The automatic transfer system according to claim 14, wherein in addition to the position number, sign information for specifying a traveling direction to an adjacent stop position or branch point is assigned to each of the plurality of branch points and the plurality of stop positions included in the guide path, when a direction of the transfer vehicle is instructed to be changed, an instruction for the transfer vehicle to move forward or backward is determined by comparing magnitude of the position numbers assigned to two adjacent locations based on the sign information, one of the two adjacent locations is a stop position or a branch point, and another of the two adjacent locations is a stop position or a branch point.

16. The automatic transfer system according to claim 1, wherein in addition to the position code, sign information for specifying a traveling direction to an adjacent stop position or branch point is assigned to each of the plurality of branch points and the plurality of stop positions included in the guide path, when a direction of the transfer vehicle is instructed to be changed, an instruction for the transfer vehicle to move forward or backward is determined by comparing magnitude of the position codes assigned to two adjacent locations based on the sign information, one of the two adjacent locations is a stop position or a branch point, and another of the two adjacent locations is a stop position or a branch point.

17. The automatic transfer system according to claim 16, wherein the sign information includes a first arrow indicating a direction at a time of advancing in a direction of an end point in a channel.

18. The automatic transfer system according to claim 17, wherein the sign information includes a second arrow indicating a direction when the channel is branched into another channel.

19. The automatic transfer system according to claim 1, wherein the position code assigned to each stop position and branch point in a same channel is obtained by increasing only one of the k pieces of numbers corresponding to an order of the same channel by 1 for each advance in a direction from a start point to an end point of the same channel.

20. The automatic transfer system according to claim 1, wherein the processing circuitry is configured to calculate the travel route by virtually moving the transfer vehicle from a current location to a target destination by comparing a position code of the current location with a position code of the target destination, recording a destination of each virtual move in a memory, and replacing the position code of the current location with the recorded destination for a subsequent comparison.

* * * * *